(12) United States Patent
Giustra et al.

(10) Patent No.: US 9,235,608 B2
(45) Date of Patent: Jan. 12, 2016

(54) DATABASE PERFORMANCE ANALYSIS

(71) Applicant: Accenture Global Services Limited, Dublin (IE)

(72) Inventors: Domenico Antonio Giustra, Milan (IT); Benedetto Secco, Milan (IT); Francesco Ferrigno, Milan (IT); Marina Papili, Milan (IT); Nico Vassallo, Milan (IT)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 393 days.

(21) Appl. No.: 13/800,660

(22) Filed: Mar. 13, 2013

(65) Prior Publication Data
US 2013/0275372 A1    Oct. 17, 2013

(30) Foreign Application Priority Data

Apr. 4, 2012   (EP) .................................. 12425069

(51) Int. Cl.
*G06F 17/30* (2006.01)
*G06F 11/34* (2006.01)
*G06F 9/46* (2006.01)
*G06F 11/32* (2006.01)

(52) U.S. Cl.
CPC ...... *G06F 17/30306* (2013.01); *G06F 11/3419* (2013.01); *G06F 9/466* (2013.01); *G06F 11/323* (2013.01); *G06F 2201/80* (2013.01)

(58) Field of Classification Search
CPC ..................................................... G06F 9/466
USPC ......... 707/688, 689, 690, 692, 693, 694, 696, 707/700, 701, 702, 704, 999.001; 717/127, 717/130
See application file for complete search history.

(56) References Cited

U.S. PATENT DOCUMENTS

| | | | |
|---|---|---|---|
| 6,782,350 | B1 | 8/2004 | Burnley et al. |
| 2005/0039171 | A1* | 2/2005 | Avakian et al. ............... 717/127 |
| 2005/0278145 | A1 | 12/2005 | Yamamoto |
| 2006/0095395 | A1* | 5/2006 | Patterson ........................ 707/1 |
| 2009/0138858 | A1 | 5/2009 | Livshits |

OTHER PUBLICATIONS

AUthor: John van Gameren, Title: Rapid offer design and order delivery, Publisher: www.Oracle.com, Pertinent pp. 1-25, Date: May 31, 2010.*
"Rapid Offer Design and Order Delivery" An Oracle White Paper, May 2010, van Gameran, John, XP002685964.

* cited by examiner

*Primary Examiner* — Syling Yen
(74) *Attorney, Agent, or Firm* — Mannava & Kang, P.C.

(57) ABSTRACT

Stored duration information may be queried to determine duration of an action including a database operation. The querying may include specifying a subset of attributes of one or more relations. The relations may include a table with rows. The attributes may describe a subset of duration information including a start time of the operation. The querying may further include specifying conditions to be met, and retrieving, according to the conditions, the specified attributes of at least one row of the relations. The querying may include calculating a duration of the action based on the start time of the action.

13 Claims, 27 Drawing Sheets

| Domain | PTT performance analysis | RODOD |
|---|---|---|
| Customer Management | covered | not covered |
| Order Management<br>create orders<br>change orders<br>revise orders<br>follow-on orders<br>cancel orders | | |
| Billing Management | | |
| Order Management Bulk | | |

Figure 16:
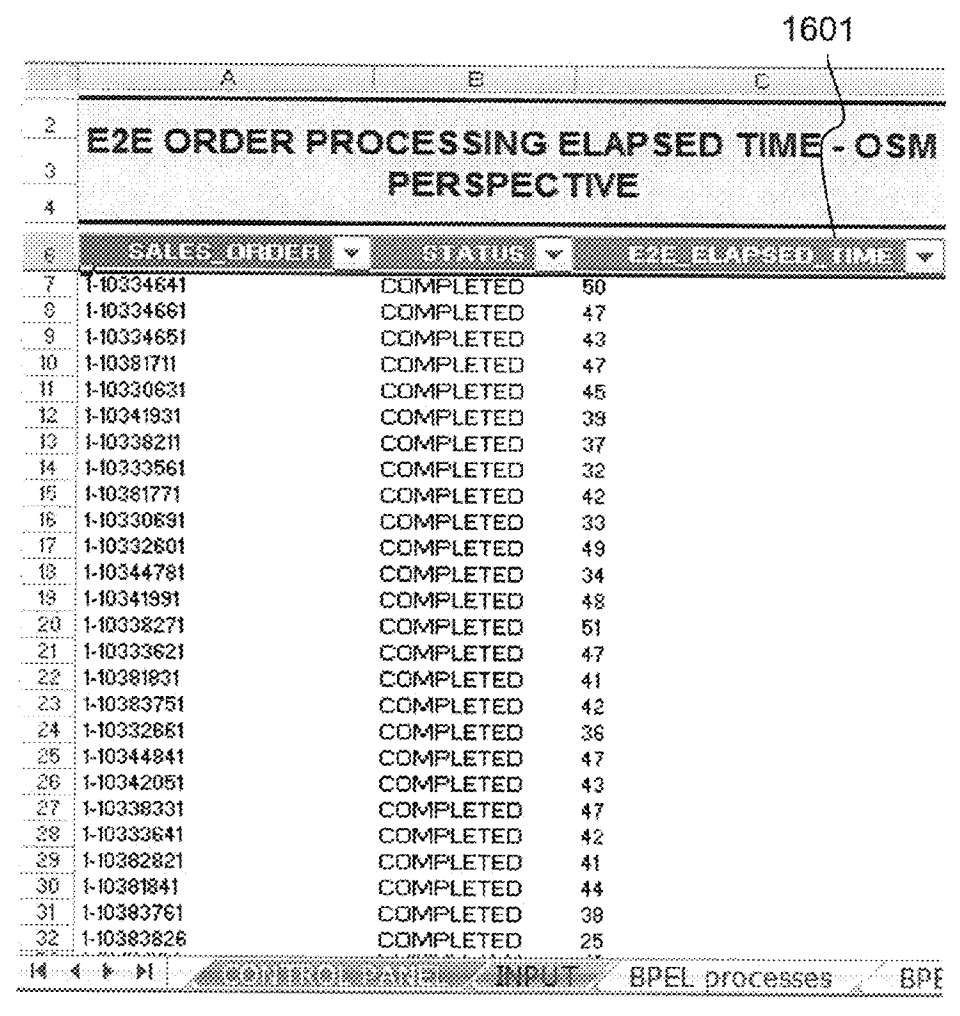

| SALES ORDER | STATUS | E2E ELAPSED TIME |
|---|---|---|
| 1-10334641 | COMPLETED | 50 |
| 1-10334661 | COMPLETED | 47 |
| 1-10334651 | COMPLETED | 43 |
| 1-1038171 | COMPLETED | 47 |
| 1-10330631 | COMPLETED | 45 |
| 1-10341931 | COMPLETED | 39 |
| 1-10333821 | COMPLETED | 37 |
| 1-10333561 | COMPLETED | 32 |
| 1-10381771 | COMPLETED | 42 |
| 1-10330691 | COMPLETED | 33 |
| 1-10332601 | COMPLETED | 49 |
| 1-10344781 | COMPLETED | 34 |
| 1-10341991 | COMPLETED | 48 |
| 1-10333271 | COMPLETED | 51 |
| 1-10333621 | COMPLETED | 47 |
| 1-10381931 | COMPLETED | 41 |
| 1-10383751 | COMPLETED | 42 |
| 1-10332661 | COMPLETED | 36 |
| 1-10344841 | COMPLETED | 47 |
| 1-10342051 | COMPLETED | 43 |
| 1-10338331 | COMPLETED | 47 |
| 1-10333641 | COMPLETED | 42 |
| 1-10382821 | COMPLETED | 41 |
| 1-10381841 | COMPLETED | 44 |
| 1-10383761 | COMPLETED | 38 |
| 1-10383826 | COMPLETED | 25 |

E2E ORDER PROCESSING ELAPSED TIME - OSM PERSPECTIVE

```
tnsnames - Notepad
File  Edit  Format  View  Help

[...]
              DATABASE SOURCE NAME (DSN)
OSM_TE=
(DESCRIPTION=
  (ADDRESS=
    (PROTOCOL=TCP)           PROTOCOL, HOST AND PORT
    (HOST=10.180.85.51)
    (PORT=1550)
  )
  (CONNECT_DATA=             SID
    (SID=OSMAIATS)
  )
)
[...]
```

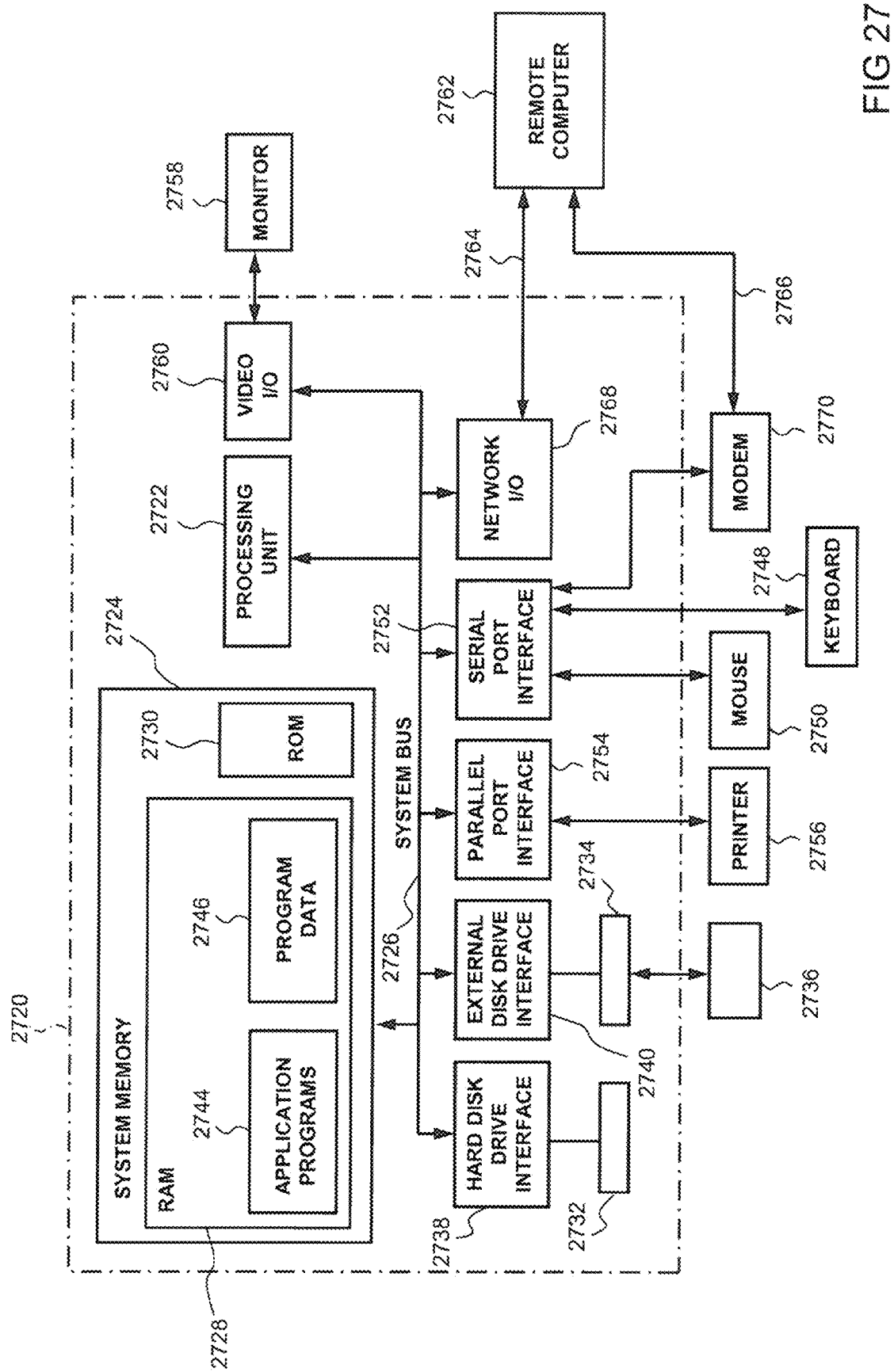

DATABASE PERFORMANCE ANALYSIS

FIELD

The application relates to database performance analysis, in particular to performance analysis of an action, wherein the action is part of a request requiring interaction with multiple databases and database applications.

BACKGROUND

Technical Definitions

A relation may be a two dimensional table. Also the relation may be a view, e.g. a materialized view. The relation includes rows and columns. The columns of the relation are named by attributes.

A view may be understood as a relation defined by a computation, e.g. a query over one or more stored relations (e.g. tables). A materialized view may be constructed periodically from a database, e.g. via a query, and stored in the database.

A database may be understood as a collection of data, possibly managed by a database management system (DBMS).

A schema or database schema may specify the logical structure of data in a database. The schema may specify one or more relations. The schema may also include one or more of the following: assertions, triggers, system defined data types or sets of values, and user defined data types.

The database may include one or more schemas, as well as object oriented functionality.

A database operation may include relational or object oriented database operations. The database operation may be understood as a command, possibly issued by a user using a data manipulation language, that affects either the schema or the content of a database; also or alternatively, the database operation could also extract data from the database. The database operation may be processed by a DBMS. Examples of database operations include queries made against the database, inserting rows in a relation, deleting or updating rows in a relation, etc.

An action may comprise one or more database operations. In some cases, the action may be a complex function carrying out significant application processing (e.g. synchronization) in addition to database operations.

An application database may be associated with multiple applications. An application database may also be associated with a single application.

Processing a request may include executing multiple applications, wherein each application performs a distinct set of functions and differs from any of the other applications. Each application may have a corresponding database that differs from any database associated with any of the other applications. Calculating the duration of a processed request may include determining how long each application is executed during the processing of the request as well as determining the duration of each action carried out by each of the executed applications.

A primary order identifier may be associated with all requests used to process an order. The primary order identifier may be a key, e.g. a unique key or primary key, of an application database. In a specific example, the primary order identifier may be implemented as a Siebel order ID. The primary order identifier may be used to track an order across a number of databases.

A request is received by an application. Processing the request may require performing one or more actions. Examples of requests are create order, create account, submit order, change order, and cancel order. Each type of request (e.g. create order may be considered a type of request) may require a different set of actions to complete. Some requests may be the same across multiple orders, other requests may differ for each order.

Processing an order may comprise fulfilling (or processing) a plurality of requests, where all requests fulfilled to process the order may be associated with the same primary order identifier.

A proper subset of a particular set is a subset that is strictly contained in the particular set. Accordingly, the proper subset necessarily excludes at least one member of the particular set. For example, the set of natural numbers is a proper subset of the set of rational numbers.

A condition may evaluate to true or false and may include comparison operators and logical operators. The condition may include further operators such as pattern matching operators.

A key may be implemented as a unique key or a primary key. Other implementations are also possible. The unique key uniquely identifies each row of a relation and comprises a single column or a set of columns. A primary key is a special case of unique key, such that a table can have at most one primary key and the primary key may not be null.

Times may be provided in a standard format, e.g. as timestamps. For example, a time may be represented as the number of seconds since the Unix epoch.

BRIEF DESCRIPTION OF THE DRAWINGS

The features described in this disclosure are set forth with particularity in the appended claims. These features will become apparent from consideration of the following detailed description, taken in conjunction with the accompanying drawings. One or more embodiments are now described, by way of example only, with reference to the accompanying drawings wherein like reference numerals represent like elements and in which:

FIG. 2 depicts request domains, and exemplary requests in the order management domain.

FIG. 12 shows an example of a Business Process Execution Language output sheet.

FIG. 16 shows order and service management application execution durations.

FIG. 21 depicts further action and application duration data of the customer relationship management application.

FIG. 24 shows exemplary network information that can be used on a client computer.

FIG. 27 shows a general purpose computer that may be used in implementation of the disclosed subject matter.

DETAILED DESCRIPTION OF THE PRESENT EMBODIMENTS

In the following text, a detailed description of examples will be given with reference to the drawings. It should be understood that various modifications to the examples may be made. In particular, elements of one example may be combined and used in other examples to form new examples. Moreover, the following description includes a number of specific queries. These queries are examples. Alternative approaches and means of achieving similar results are also envisioned.

Also, in the following description and in the figures, a comma (,) is used as a decimal separator (also referred to as a decimal mark), i.e. to separate the units and tenths position of a number. For example, "25, 34" refers to twenty-five and thirty-four hundredths.

Figure 1:
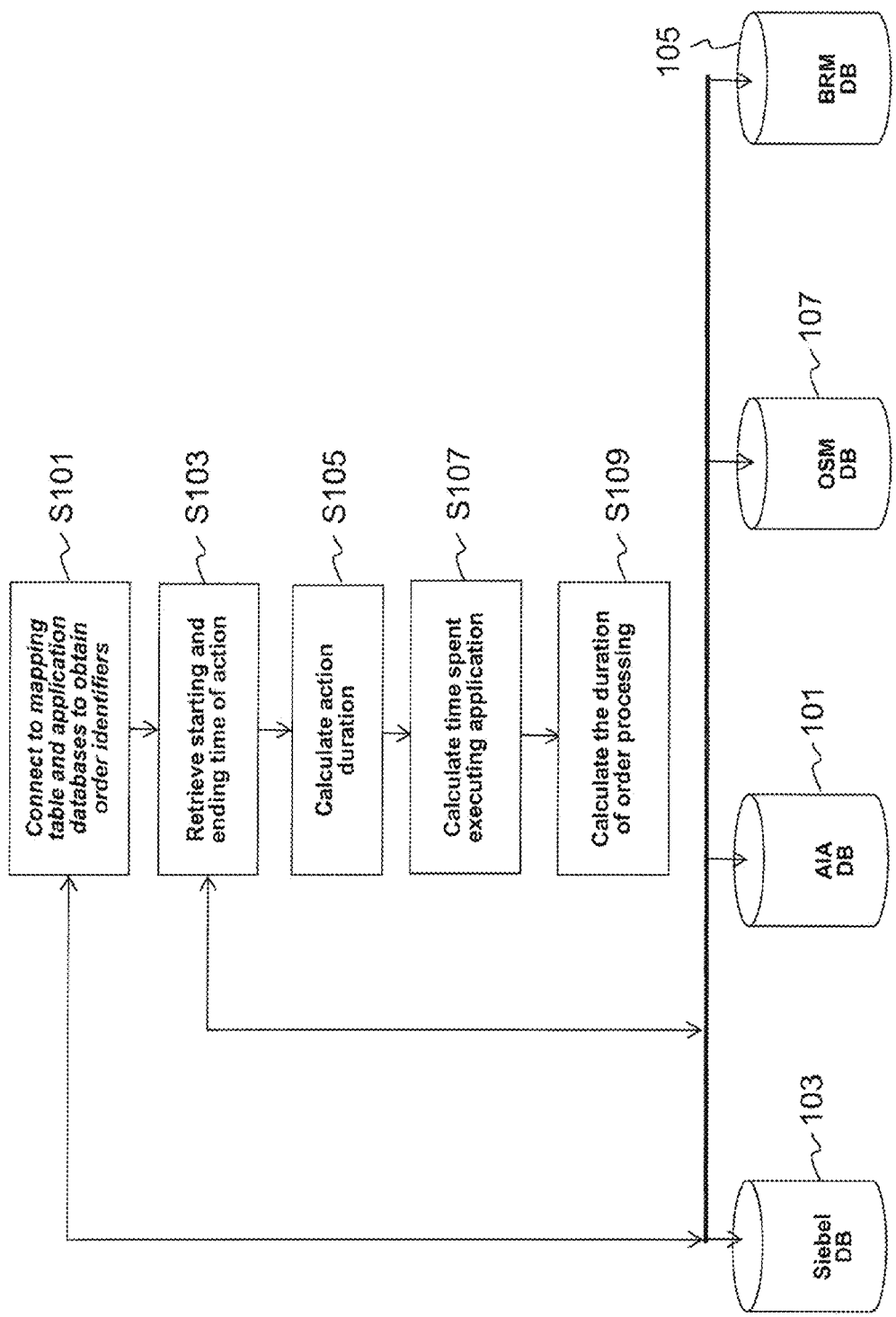
FIG. 1 depicts a flow chart showing an exemplary method of calculating a duration of a processed order.

FIG. 1 depicts steps that may be implemented in order to calculate a duration of a an order (i.e. the duration of a processed order). In addition, FIG. 1 shows databases that may be accessed while carrying out particular steps. In particular, in processing a request may include executing an integration application, a customer relationship management application (CRM), e.g. Siebel CRM, an order and service management (OSM) application, and a billing and revenue management (BRM) application. The integration application may also be referred to as an AIA application or a business process execution language (BPEL) application.

The integration application may have a corresponding integration database 101. Also, the CRM application may have a corresponding CRM database 103. Moreover, the BRM application may have a corresponding BRM database 105, and the OSM application may have a corresponding OSM database 107.

The steps depicted in FIG. 1 may be carried out by a performance test tool (PTT), which may be implemented as a software application on a client computer. The performance test tool may be implemented using Microsoft Office, possibly including an Oracle client and Microsoft Excel. According to a specific example, PTT may be programmed in Visual Basic for Applications (VBA). Although some examples below refer to the PTT, various other mechanisms for implementing the claimed subject matter are also possible.

To begin calculating the duration of the processed order, PTT may calculate a duration of an action. To calculate the duration of the action, PTT may determine a primary order identifier of the action. The primary order identifier can be implemented as a CRM order identifier, in particular, a Siebel order identifier. All actions carried out in order to process the order may be associated with the same primary order identifier.

At step S101, PTT connects to a mapping table and/or application databases and uses primary order identifiers to obtain secondary order identifiers. The primary order identifier may be referred to as a tracking key, since it can be used to track a particular order across multiple applications. Thus, the primary order identifier may appear in a database associated with each of the multiple applications.

The secondary order identifier may be referred to as an order identification key, an identification key or a product identifier. For example, a secondary order identifier may be an order identification key for the AIA application, or an order identification key for the OSM application, or an order identification key for the BRM application. A specific example of a secondary order identifier is the sequence identifier (ID) described in connection with FIG. 15. The sequence ID is associated with the primary order in the OSM database 107. One reason the sequence ID is useful is that, in contrast to the primary order identifier, the sequence ID is recognized by the OSM application. Thus, the specific sequence IDs returned by PTT can be used to retrieve further information about actions (e.g. tasks) by means of the OSM application. In some cases, it is not be possible to use primary order identifiers to retrieve information about actions from the OSM application.

Multiple secondary order identifiers may be associated with a primary order identifier.

In the context of the present application, the primary order identifier may be used to query performance information associated with an action or an order. The secondary order identifier may be useful for interacting with a particular application in order to perform performance analysis or to learn more about an action.

The integration database 101, possibly implemented as an AIA database, may include the mapping table, also referred to as a cross reference table. The four applications, i.e. CRM, AIA, OSM, and BRM, along with their corresponding application databases, may each perform actions in order to process an order. In a specific example, CRM, AIA, OSM and BRM are implemented as part of a rapid offer design order delivery (RODOD) software suite. Each of the applications includes a corresponding application database. Each application may include values that are represented differently but used for similar purposes.

For example, a customer identifier within the CRM database 103 (possibly implemented a Siebel database) may be represented as a one digit number followed by a hyphen followed by an eight digit number. In contrast, a customer identifier within the BRM database 105 may be represented by a one digit number followed by a hyphen followed by three letters followed by a two digit number. Thus, each application database may represent a value (e.g. a customer identifier) with different data types possibly having different storage requirements. The mapping table of the integration database 101 may cross reference values for a different application databases, such that a customer identifier of the CRM database 103 can be used to find a corresponding customer identifier of the BRM database 105. Similar cross reference information may be present for other values (e.g. order identifiers) and other applications. The mapping table may be used when information is updated in one application (e.g. a customer is updated in the CRM database 103) and the changes must be propagated to other RODOD applications (e.g. the BRM application and the corresponding BRM application database 105). In some cases, multiple mapping tables cross referencing primary order identifiers to secondary identifiers (e.g. in the OSM database 107 as well as in the integration database 101) may be queried.

A primary order identifier may be implemented as a CRM order identifier. In particular, the primary order identifier may be a unique value associated with a request. The primary order identifier may be a key of an application database, e.g. the CRM database 103. More specifically, the primary order identifier may be the primary key of the CRM database 103.

In the context of the present application, a key of a database or a primary key of a database may be understood as the key of a table in the database or the primary key of a table in the database.

After a request, or more specifically a request carried out to process an order (e.g. create order), is submitted from the CRM application to the AIA application or the OSM application, the AIA application generates an instance identifier for each AIA action (e.g. a process or subprocess) associated with the original primary order identifier. The OSM database 107 includes a task identifier for each orchestration function associated with the primary order identifier. A task identifier may also be referred to as a task ID. In addition, an instance identifier may be referred to as an instance ID.

According to one example, the primary key of at least one table in the AIA database 101 is the instance identifier, and the primary key of at least one table in the OSM database 107 is the task identifier. Both the instance identifier and the task identifier are linked to the original primary order identifier (e.g. the CRM order ID). Continuing the example, the CRM order identifier may be stored in the CRM database 103 in the "ORDER_NUM" column of the "S_ORDER" table. In addition, the CRM order identifier may be stored in the OSM database 107 in a "NODE_VALUE_TEXT" column of the "OM_ORDER_INSTANCE" table.

At step S103, stored duration information (e.g. duration information previously stored in one of the application databases mentioned above) may be queried in order to retrieve action start and end times. Stored duration information for an application may be stored in an application database corresponding to the application and/or in the integration database 101. For example, the duration information for actions associated with the CRM application may be stored in the CRM database 103 and the integration database 101.

Each application database may have different stored duration information for the same order. For example, stored duration information in the CRM database 103 may reflect actions performed before establishing a primary order identifier that may not be reflected in the other databases. Similarly, stored duration information in the integration database 101 may reflect message queuing times that are not reflected in other databases.

An action may include multiple database operations, such as one or more update, insert, or delete operations. Each application may refer to actions using different terminology. For example, in the context of the integration application, an action may be a process including one or more subprocesses. In the context of the OSM application, an action may be a task. In general, an action involves one or more database operations performed on an application database, and duration information for the action is stored in the application database (i.e. stored duration information) during and/or after performance of the action.

The action start and end times may be retrieved via a query by specifying a proper subset of attributes of a plurality of relations, wherein the relations include at least one table and each relation includes plurality of rows. In some cases, e.g. for the OSM database 107, the relations may include at least one view. One column of the relations described by the attributes includes the primary order identifier or the secondary order identifier. It is also possible that one of the attributes describes a column with primary order identifier and another of the attributes describes a column with secondary order identifier. An attribute describes a column with duration information. In particular, the attributes may describe a plurality of columns with duration information, including a column with action start times and a column with action end times.

The query may retrieve one action and corresponding start and end times in order to calculate the duration of the action. Multiple queries may be performed in order to calculate the duration of a request or an order. Alternatively, a query may retrieve multiple actions.

The proper subset of attributes specified in the query may be significantly less the total number of attributes in the plurality of relations. In particular, the proper subset of attributes may be less than 15% of the attributes of the plurality of relations, or less then 10% of the attributes of the plurality of relations or less than 5% of the attributes of the plurality of relations.

Examples of processed requests are as follows: to create an order, change an order, revise an order, create a follow on order, or cancel an order. Each request may require the instantiation of different items. In some cases, an item may be a product. For example, to create an order, a Mobile Service order may be instantiated as a collection of Multimedia Message Service (MMS), Short Message Service (SMS), and voice items. Alternatively, an order for a simple phone may require the instantiation of fewer, less complex items.

The plurality of relations specified in the query may be significantly fewer than the relations in an application database. For example, the CRM database 103 may include over 70 relations (including more than 50 tables and more than 20 views), whereas a query of the CRM database 103 might only include four relations.

The query may be implemented in structured query language (SQL). If the query is implemented in SQL, the proper subset of attributes of the plurality of relations may be specified as a select list (also referred to as a select expression) in a select statement. The query may also specify conditions that must be met by at least one row of the relations. Each row may include a primary order identifier and stored duration information for an action. At least one of the conditions may describe (or specify) attributes of multiple relations. In the context of an SQL select statement, the conditions may be part of a WHERE clause.

Figure 15:
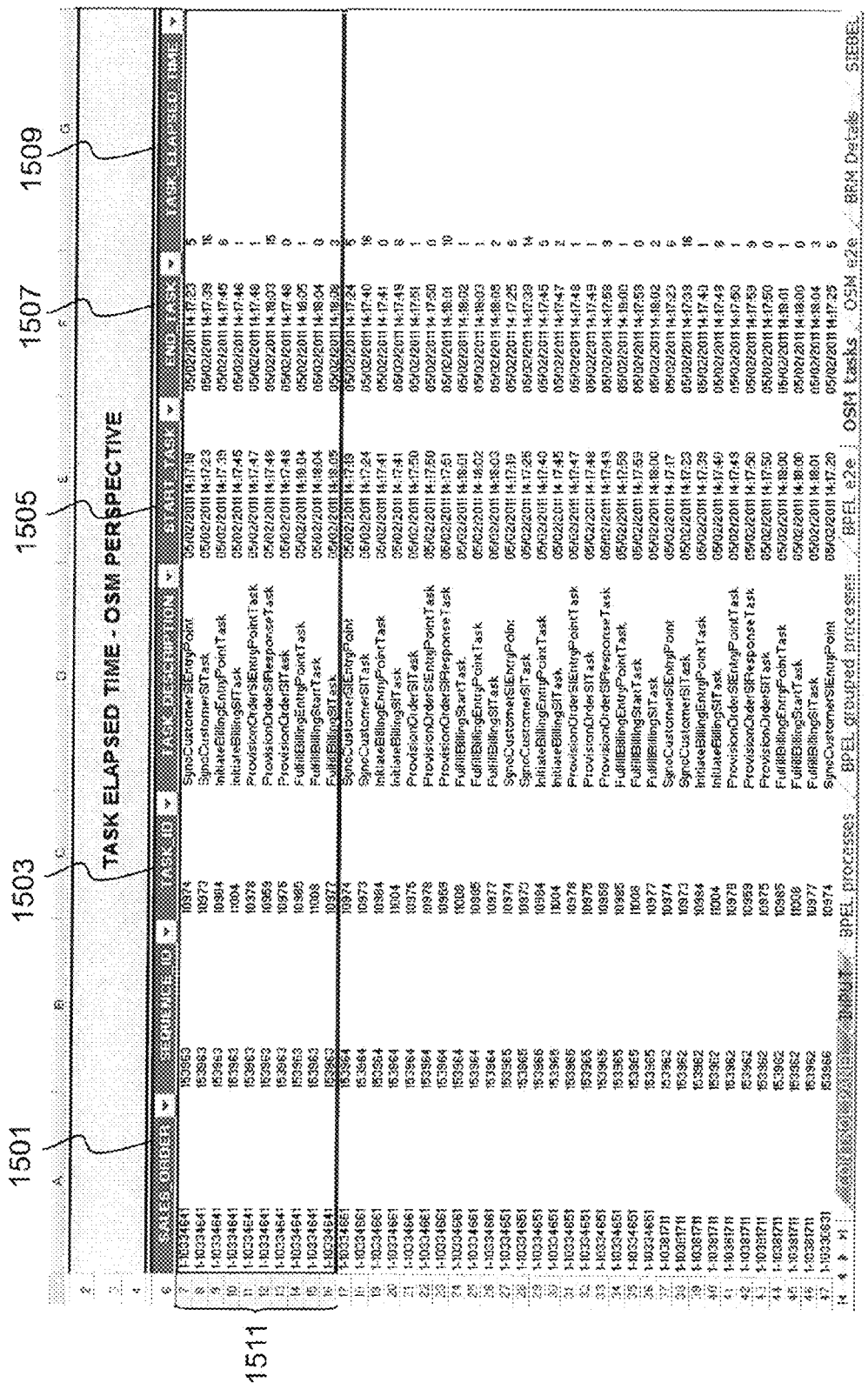
FIG. 15 depicts a sheet showing order and service management application actions and corresponding action durations.

Step S105 may include calculating the duration of the retrieved action (i.e. the retrieved row specifying action information including stored duration information of the action) based on the action's start time and end time. The duration may be calculated by performing arithmetic database functions. Arithmetic database functions may include subtraction, summing, rounding, and/or time conversion. For example, in the context of the OSM database 107, the start time of the action may be subtracted from the end time of the action and multiplied by a constant in order to calculate the duration of the action. The query specified below in the context of FIG. 15 provides a specific example.

At step S107, a duration of application execution may be calculated. The calculation of the duration of application execution may be based on the durations of a plurality of actions performed during the execution of the application. The duration of each of the actions may be calculated as described above. In one example, at least two of the action durations calculated based on retrieved actions start times and end times may be used to calculate the duration of application execution.

Accordingly, the duration of application execution may be calculated by determining the actions performed during application execution with a primary order identifier and then identifying the earliest action (or first action) with the primary order identifier and the latest action (or last action or final action) with the primary order identifier. The earliest action may be defined as the action with the earliest start time and the latest action may be defined as the action with the latest action end time.

Thus, according to one example, calculating the duration of application execution may proceed by subtracting the timestamp of the first action performed during execution of the application from the timestamp of the last action performed during execution of the application. According to another example, the duration of application execution is calculated by adding up (i.e. adding together) the durations of each of the actions performed during execution of the application, where each action has the same primary order identifier.

At step S109, the duration of the processed order may be calculated based on the application execution duration. In particular, the duration of the processed order may be calculated by adding up all the action durations (i.e. action execution durations) with the same primary order identifier across all applications. In addition, calculating the duration of the processed order may further include adding the action durations with the secondary order identifier, for all secondary order identifiers. The action durations may be accessed by querying the integration database 101 or by querying each application database.

The duration of the processed order may be calculated based on the calculated action durations and/or the calculated application execution durations. In particular, the duration of the processed order may be calculated by summing the durations of the actions associated with the primary order identifier and the actions associated with each secondary order identifier. In addition, or alternatively, the duration of the processed request may be calculated by summing the durations of the application executed to process the request.

The performance analysis method described in the context of FIG. 1 enables evaluation of the duration of RODOD actions (e.g. processes and task composing the processes) spanning across CRM, BRM, AIA, and OSM applications. PTT also provides the capability to explore the latency of actions performed by a single application (e.g. a CRM application such a Siebel, an OSM application, an AIA application, or a BRM application).

In particular, PTT is operable to provide performance analysis in order to measure end to end (E2E) order duration. The processing of an order includes execution of complex functions that are executed by instantiating multiple actions (e.g. subprocesses) on RODOD applications. The order may be associated with a customer or account; the order may include one or more products. In order to calculate the order process timing, Action execution time can analyzed using the PTT and corresponds to a number of factors. For example, factors contributing to action execution time may include application processing time, database processing time, queue/thread latency, etc.

Advantageously, PTT makes it easy to detect performance bottlenecks in a processed request involved in the execution of multiple applications, where each application has a corresponding application database (e.g. RODOD). In particular, actions responsible for poor performance (e.g. actions with a long duration, or a duration more than 3 seconds or more than 5 seconds) can be identified and passed along to a user in order to develop optimized actions, fine tune design architecture and meet expectations for a production environment. Moreover, PTT facilitates the calculation of the duration of end to end order processing.

The disclosed subject matter can scale to large numbers of orders and provide action durations (e.g. process and subprocess) of each request, as well as for an entire order. In particular, the duration of requests processed in order to execute (or process) an order can be calculated. The disclosed subject matter also provides average duration of specific application actions including account creation, order creation, and order fulfillment for the CRM application. The average order duration (i.e. the average amount of time required to process an order) can also be calculated.

In view of these values calculated as described above, performance bottlenecks can be efficiently detected by analyzing times and durations retrieved during performance analysis. The times and durations can be evaluated in view of expectations. Accordingly, a determination can be made as to whether to carry out a performance improvement. Specifically, an application or action can be identified for performance improvement based on the average application and/or action durations. In addition, the individual action durations could also be consulted.

According to a specific example, action durations (e.g. process, subprocess, and task durations), as well as total order duration, may be provided in spreadsheets, or some similar format, so that the values can be sorted.

FIG. 2 depicts domains of performance analysis. Each domain may refer to a type of request. For example, requests in an order management domain may include create order, change order, revise order, create follow on order, and cancel order. An order management bulk domain may aggregate requests from the order management domain. A customer management domain may include an account creation request, an account deletion request, and other account related requests. Other domains are also possible.

A specific example of FIG. 2 includes domains applicable to the telecommunication industry, particularly business processes and products of the telecommunications industry. However, the use of similar techniques in other industries is also possible. For example, a tool extension may be added to the PTT in order to configure industry specific business processes and new applications that RODOD would be integrated with. The disclosed subject matter may be used to evaluate the performance of multiple applications, where each application is connected to a corresponding application database. According to an example, the multiple applications act in combination in order to process an order. More specifically, the applications are combined in RODOD.

RODOD is a combination of Oracle applications with a set of process integration packs (PIPS) built in. RODOD has the purpose of providing an end to end order delivery solution. With RODOD, service providers can effectively manage front and back office operations for new product offers, as well as capture and efficiently manage order provisioning tasks for end to end visibility across the order life cycle. RODOD applications may be connected as specified in FIGS. 1 and 2 of "Rapid Offer Design and Order Delivery", an Oracle white paper, May 2010, retrieved, 6 Feb. 2012 from http://www.oracle.com/us/industries/communications/rapid-offer-design-order-wp-077276.pdf.

RODOD consists of Siebel CRM, OSM, Product Hub For Communications, AIA, and BRM. Complementary products include service fulfillment tools, such as Unified Inventory Management (UIM) and Automatic Service Activation Program (ASAP).

Processing an order may require execution of multiple applications and interaction with multiple application databases. Each application database may have at least one data type and one key (e.g. a primary key) that differs from the data types and keys of any other application database. Specifically, each application database may include tables with attributes (e.g. order identification) that are represented using different data types in comparison to attributes with the same name in other application databases. For example, an identifier represented with a plurality of characters in a first application database may be represented using twice as many characters in a second application database.

Each application database may also have a schema that differs from any other application database schema. In particular, no application uses the same application database as another application. In other words, each application database has a unique schema. Each schema may define data types (e.g. standard data types, and/or user defined data types), tables, views, attributes, storage procedures, assertions, and triggers.

The multiple applications executed to process a request (e.g. create an order or change an order) may include a hub for communications (e.g. Product Hub For Communications), which synchronizes product offers, price plans, etc., across order capture, billing, and order management functions. The applications may further include a CRM application which provides sales catalogue definitions, multi-channel order capture, and customer support. The applications may further include a service application that provides support for trouble ticketing. In addition, the applications may include an order and service management (OSM) application that performs order wrapping, decomposition, and temporary storage queues (TSQ) during order capture and orchestration, and a central manager of order changes, fallouts, and status. In addition, the applications may include a billing and revenue management (BRM) application that provides account, offer, purchase, rating, and billing management. Also, the multiple applications executed to process the request may include an integration application that provides productized and extensible integration between the other applications.

RODOD may enable a user to monitor and order across applications (Siebel CRM, AIA, OSM, and BRM) by logging into each application user interface and searching for the order. Each order created, configured, and submitted from the Siebel CRM application may be processed through AIA, the OSM system which manages the entire range of subsequent activities involved in executing the order for fulfillment of life cycle across RODOD. Thus, for each application a set of actions, e.g. processes and sub processes, are performed in to process the request. Multiple requests may be processed in order to process the order, i.e. bring the order through the order fulfillment of life cycle.

It may be that certain duration information can only be retrieved from one application database. For example, duration information stored before a primary order identifier is created can only be retrieved from the CRM database 103. This duration information may include duration of customer creation and/or order creation. The time when an order is completed may also be retrieved from the CRM database 103, though this duration information may be available from other databases as well.

Figure 3:
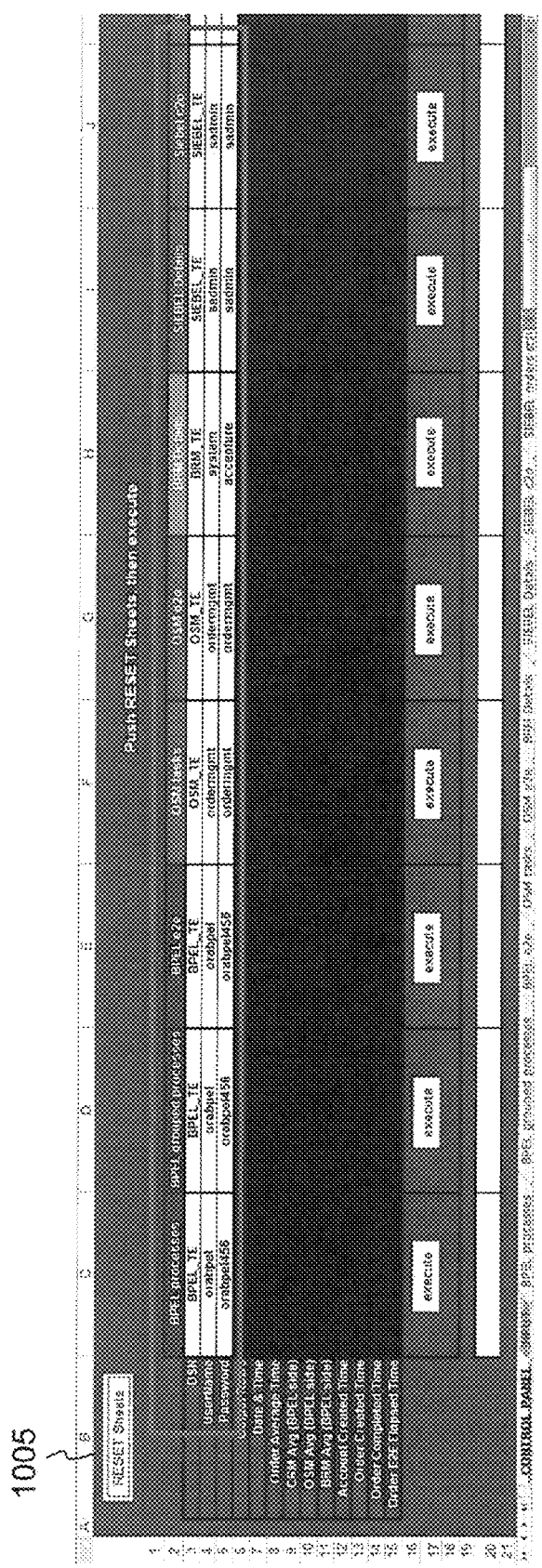
FIG. 3 shows a control panel for accessing a performance test tool.

FIG. 3 depicts four applications executed in order to process a request. According to the example of FIG. 3, the four applications are the applications of RODOD, i.e. CRM, OSM, AIA, and BRM.

In addition, FIG. 3 depicts a control panel of the PTT, which can be used to calculate the duration of the process request. The control panel may be displayed in a spreadsheet. The control panel may allow a user to insert a database source name (DSM), a user name, and a password for each application database, i.e. the integration database 101, the CRM database 103, the BRM database 105, and the OSM database 107.

A reset sheet button 1005 is discussed in connection with FIG. 10.

Figure 4:
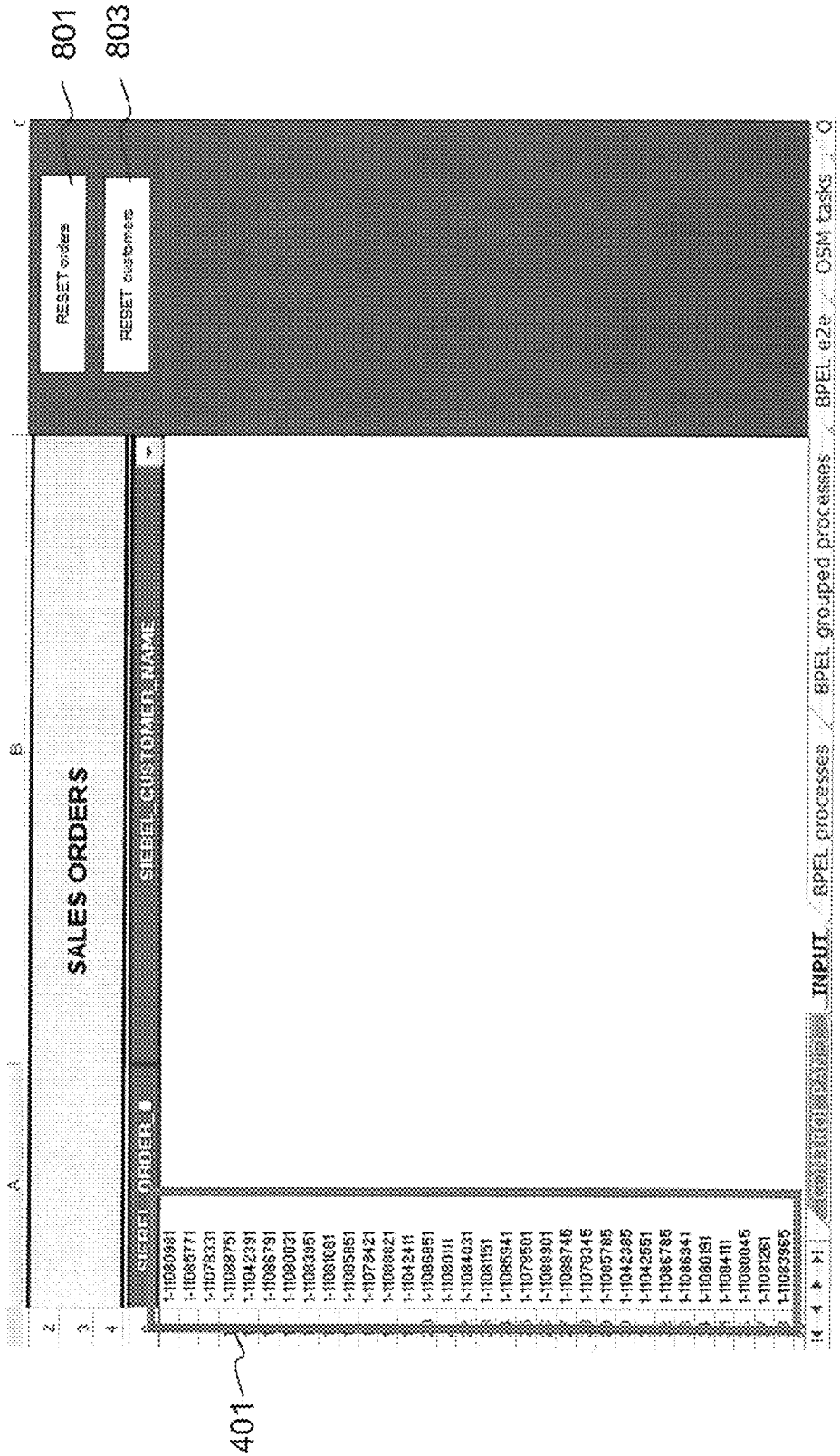
FIG. 4 shows an input sheet for use with the performance test tool.

FIG. 4 depicts an input sheet for the PTT.

The input sheet may include a list of primary order identifiers 401. The primary order identifiers may be implemented as CRM order identifiers (also referred to as Siebel order identifiers).

Figure 5:
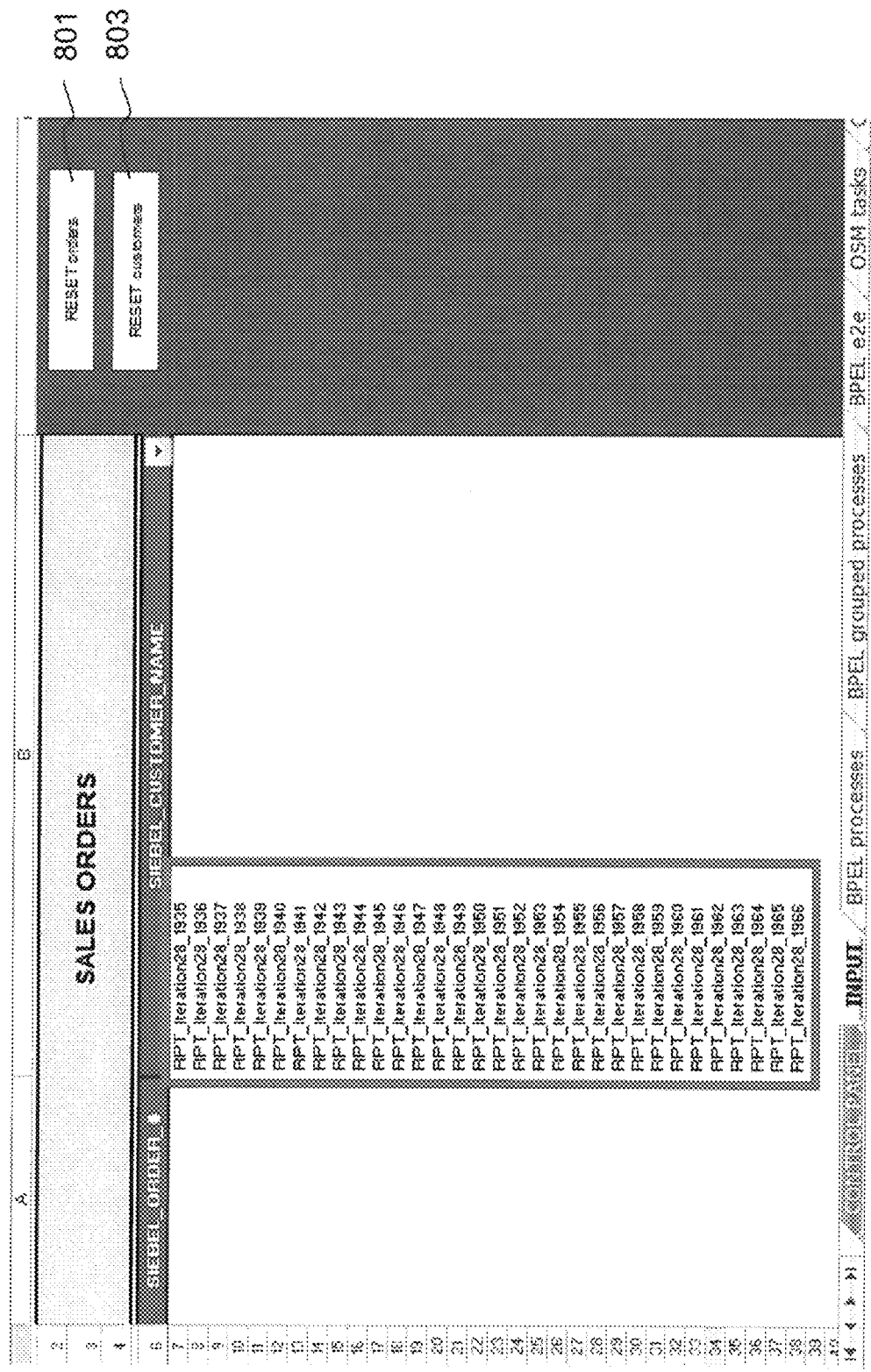
FIG. 5 shows another example of the input sheet for use with the performance test tool.

FIG. 5 also depicts the input sheet of the PTT. A reset orders button 801 and a reset customers button 803 are discussed in connection with FIG. 8.

In this example, the input sheet includes multiple account identifiers (also referred to as customer identifiers). The account identifiers can be used to retrieve the primary order identifiers), also referred to as order identifiers or order numbers.

Figure 6:
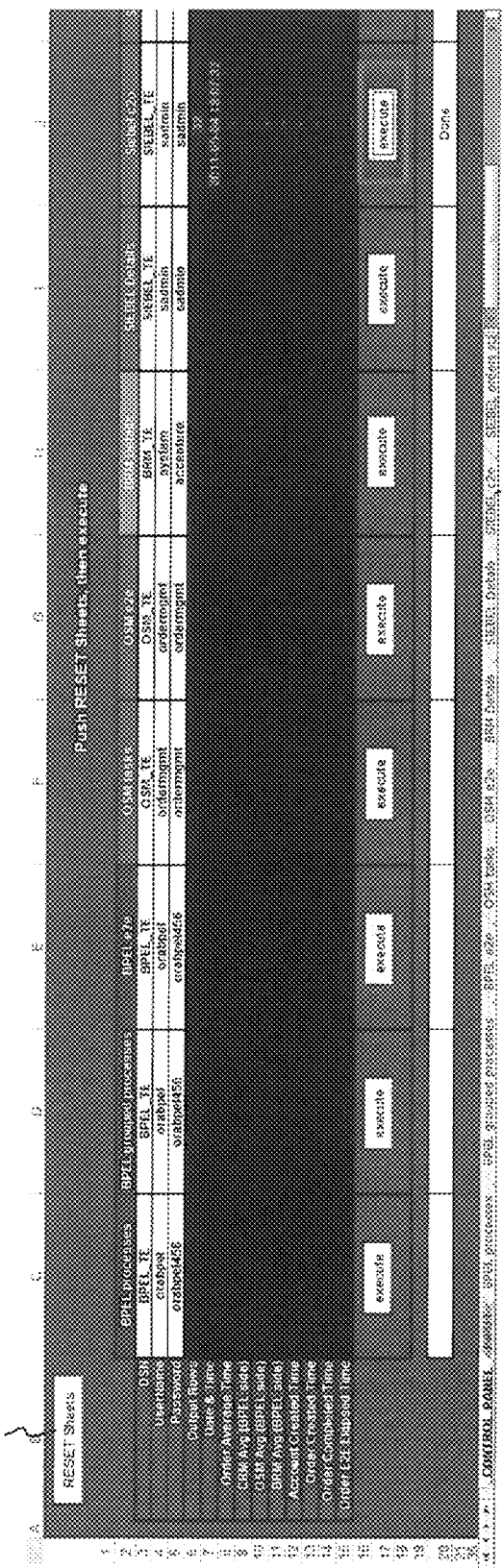
FIG. 6 shows another example of the control panel for use with the performance test tool.

FIG. 6 also depicts the control panel of the PTT.

By selecting a transform sheet 601 (labeled Siebel c2o, where c2o refers to customer identifier to order identifier) the account (or customer) identifiers in FIG. 5 can be used to retrieve primary order identifiers. The retrieval is performed automatically via a query of the CRM database 103.

Figure 7:
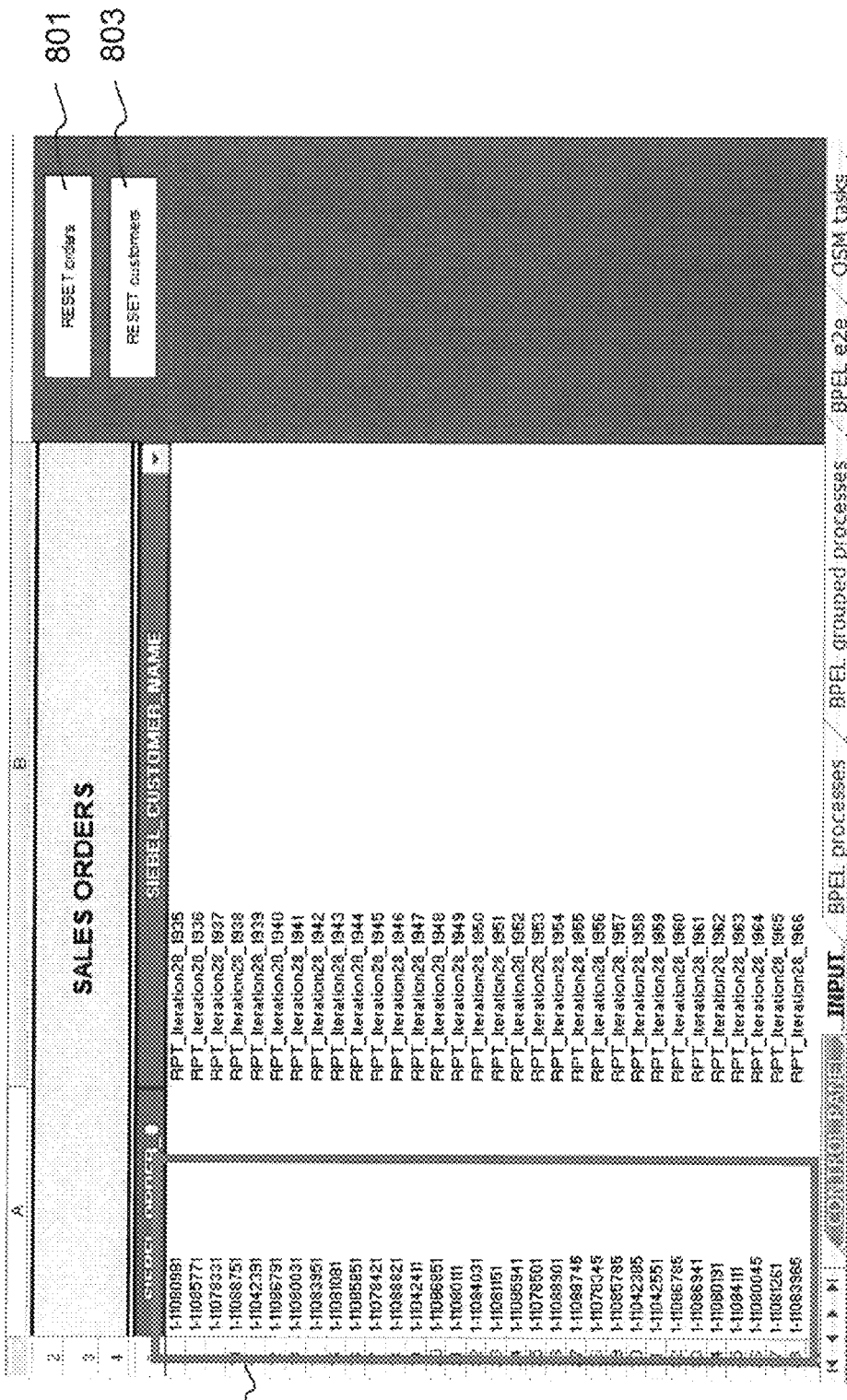
FIG. 7 shows another example of the input sheet for use with the performance test tool.

FIG. 7 also depicts the input sheet of the PTT. An identifier list 701 has been retrieved by means of the account identifiers depicted in FIG. 5. The retrieval was carried out in response to accessing of the transform sheet 601.

Figure 8:
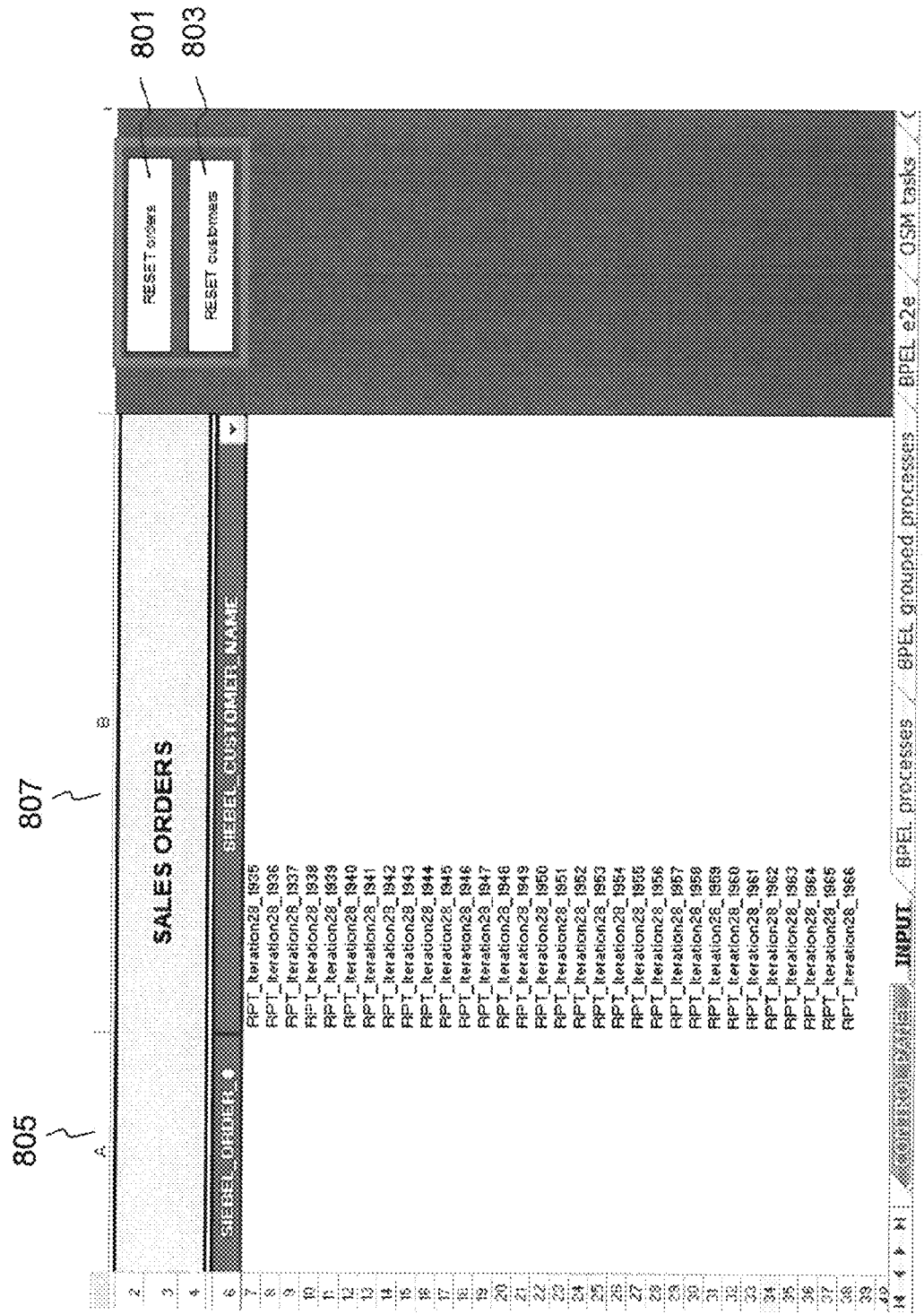
FIG. 8 shows yet another example of the input sheet for use with the performance test tool.

FIG. 8 depicts another example of the input sheet of the PTT. The input sheet includes the reset orders button 801 and the reset customers button 803. The reset orders button 801 may be used to clear primary order identifiers from an order column 805. The reset customers button 803 may be used to clear account identifiers from an account identifier column 807.

Figure 9:
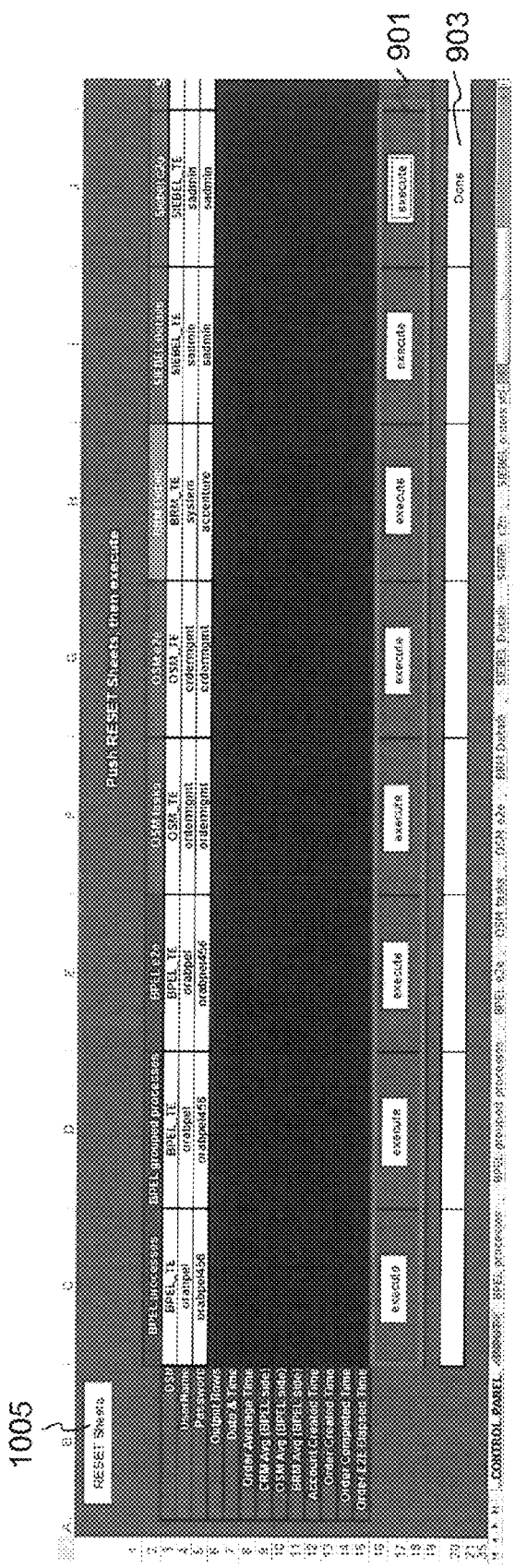
FIG. 9 shown yet another example of the control panel for use with the performance test tool.

FIG. 9 depicts the control panel of the PTT. After the primary order identifiers have been determined, i.e. directly received or derived, duration information stored in the application databases may be queried. The query may be triggered by pressing an execute button in a row of execute buttons 901. A status indication 903 indicates that the list of account identifiers has been used to successfully retrieve the list of primary order identifiers.

Figure 10:
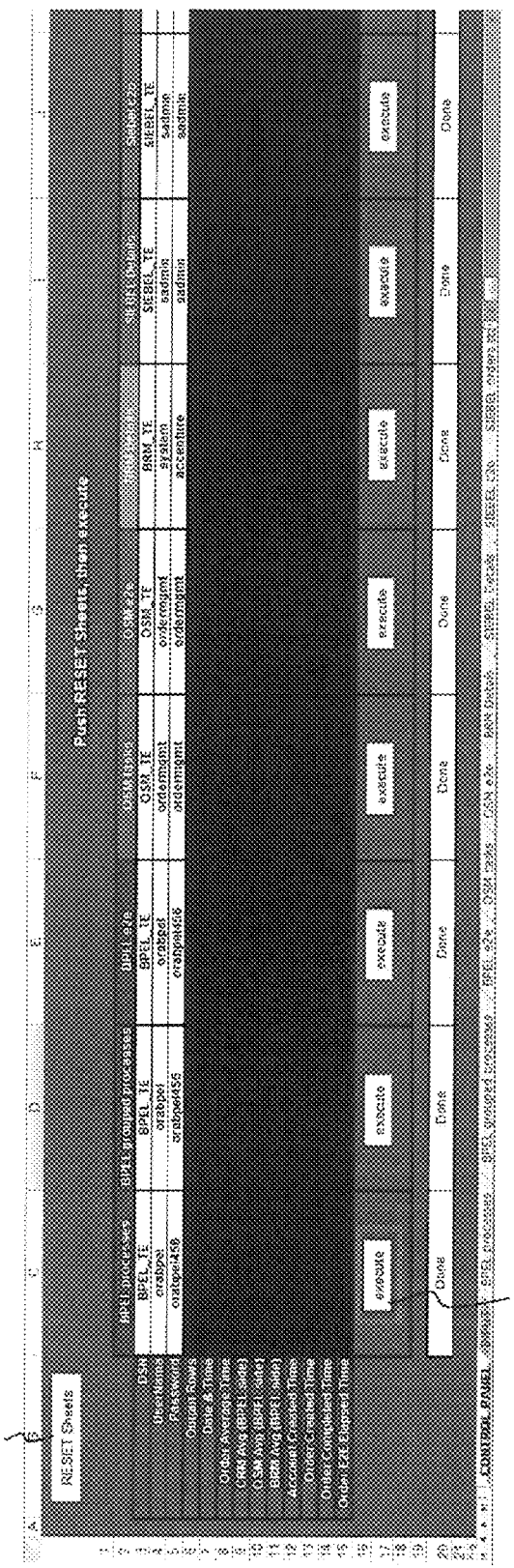
FIG. 10 shows a further example of the control panel for use with the performance test tool.

FIG. 10 depicts the control panel of the PTT. By clicking on an integration analysis execute button 1001, performance analysis of processed requests in the integration database 101 can begin. "Done" may appear in one or more columns of the control panel. This may indicate that analysis has been performed. The control panel can be reset and the "Done" cleared by clicking on the reset sheet button 1005.

Analysis can be focused on each application of the multi-application solution (e.g. RODOD). In the example of RODOD, the application include AIA (BPEL), OSM, BRM, and CRM (e.g. Siebel). For each application, one or more areas of performance analysis are carried out. For the integration application (e.g. AIA), actions (referred to as processes) are analyzed, grouped processes are analyzed, and order durations are calculated.

For the CRM application, details relevant to performance analysis are determined, account identifiers are converted to primary order identifiers, and order and account duration information is determined. For the OSM application, OSM action durations are determined, and total order execution for the OSM application is determined. For the BRM application, detail information relevant to performance analysis is determined. All of these areas of performance analysis will be discussed in more detail below. An end to end order duration (i.e. for all applications) for an order with a primary order identifier may be determined by summing the durations of actions having the primary order identifier and the durations of actions having secondary order identifiers derived from the primary order identifier. An order duration for a particular application (e.g. OSM) maybe determined by summing durations of actions having the primary order identifier or secondary order identifier corresponding to the order, which were executed with the particular application.

The description of FIGS. 11 to 16 includes exemplary queries of stored duration information. It should be understood that the queries are presented as examples and that other ways of querying stored duration information are envisioned. PTT may include at least 22 different queries. In particular, there may be at least 3 queries targeting the integration database 101, at least 2 queries targeting the OSM database 107, at least 2 queries targeting the BRM database 105 and at least 14 queries targeting the CRM database 103. Also, PTT may include at least one date/time query.

Figure 11:
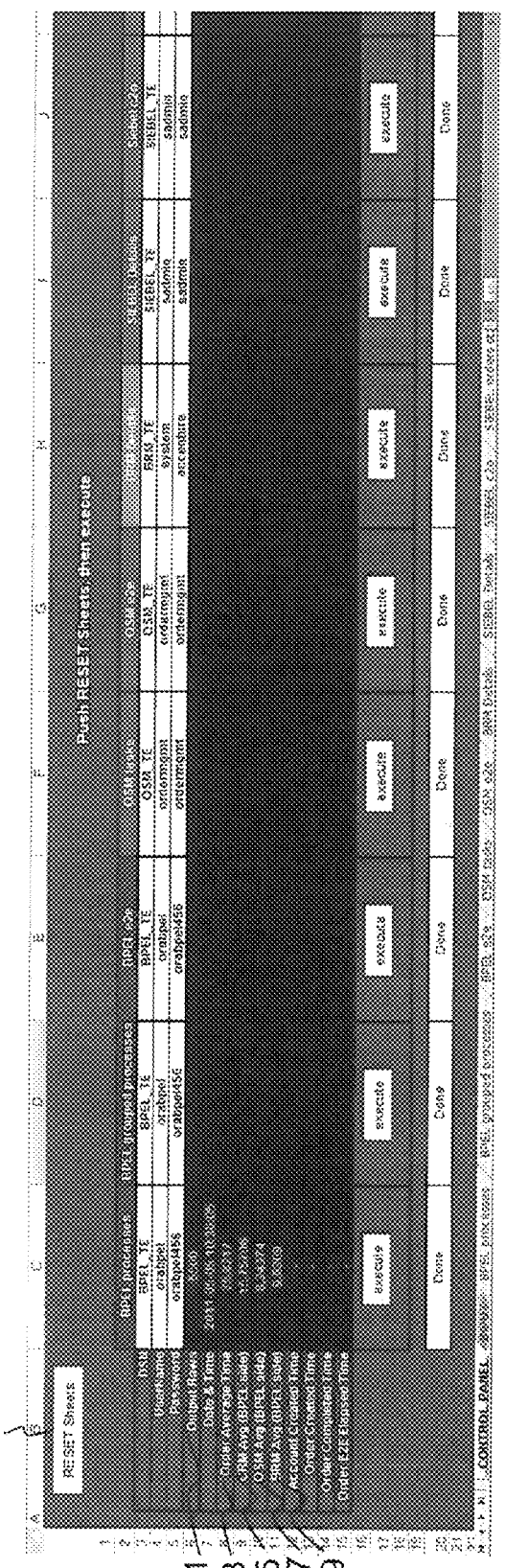
FIG. 11 shows an example of the control panel including output rows, time, and application information.

FIG. 11 shows a summary of results from querying the integration database 101. The summary of results depicted can be obtained using the following query:

```
SELECT      SUBSTR(TITLE,12) SALES_ORDER -- sales order
    ,INSTANCE_KEY
    ,BPEL_PROCESS_NAME PROCESS_NAME
    ,CASE WHEN BPEL_PROCESS_NAME LIKE '%Siebel%'
    THEN 'CRM'
        WHEN BPEL_PROCESS_NAME LIKE '%Billing%'
        THEN 'BRM'
        WHEN BPEL_PROCESS_NAME LIKE '%BRM%'
        THEN 'BRM'
        WHEN BPEL_PROCESS_NAME LIKE '%OSM%'
        THEN 'OSM'
        WHEN BPEL_PROCESS_NAME LIKE '%AIA%'
        THEN 'AIA'
        ELSE 'TO_VERIFY' END REFERENCE_SYSTEM
    ,STATE_TEXT STATE_DESCRIPTION
    ,CREATION_DATE START_PROCESS
    ,MODIFY_DATE END_PROCESS
    ,(((EXTRACT (DAY FROM(MODIFY_DATE-
CREATION_DATE)))*24*60*60)+((EXTRACT (HOUR
FROM(MODIFY_DATE-
CREATION_DATE)))*60*60)+((EXTRACT (MINUTE
FROM(MODIFY_DATE-
CREATION_DATE)))*60)+(EXTRACT (SECOND
FROM(MODIFY_DATE-
CREATION_DATE)))) PROCESS_ELAPSED_TIME -- in seconds
FROM    BPEL_PROCESS_INSTANCES
WHERE      TITLE LIKE 'Sales Order 1-1271033%' -- *****
INPUT --> sales order
    AND STATE <> '9'
```

-continued

```
GROUP BY SUBSTR(TITLE,12)
    ,INSTANCE_KEY
    ,BPEL_PROCESS_NAME
    ,STATE_TEXT
    ,CREATION_DATE
    ,MODIFY_DATE
ORDER BY INSTANCE_KEY
```

In the query above, the conditions that must be met by each row of the relations (i.e. the WHERE clause) include "TITLE LIKE 'Sales Order 1-1271033%'". However, this is merely for purposes of illustration. When calculating the duration of multiple orders, the primary order identifiers on the input sheet would each be used in place of the constant value "1-1271033" in order to obtain duration information for each order input. This could be accomplished, e.g. by specifying a variable instead of the constant value above.

A number of the queries discussed below (e.g. in connection with FIG. 13) also include constant values for a primary order identifier. It should be understood that similar considerations apply for these queries as well. In particular, the constant values may be replaced by a variable or other placeholder such that action durations or order durations for various primary order identifiers can be calculated.

An output rows field 1101 shows a value of 5500. Each row may correspond to an action. An order average time field 1103 shows a value of 25,8217. This value indicates an average order duration of just over 25 seconds. A CRM average duration field 1105 shows a value of 15,75706. This value indicates an average duration that the CRM application was executed to process each order. An OSM average duration row 1107 has a value in a first field of 0,24374. The OSM average duration row 1107 indicates an average duration that the OSM application was executed in order to process an order. The BRM application average duration row 1109 has a value of 9,8209. This value indicates the average duration that the BRM application was executed to process each order. Thus, according to the example depicted in FIG. 11, the CRM application was executed an average of 15,75706 seconds (just over 15 seconds) during the course of processing each order. Similarly, the OSM application was executed an average of 0,24374 seconds during the processing of each order. Also, the BRM application was executed an average of 9,8209 seconds during the processing of each order.

Figure 12:
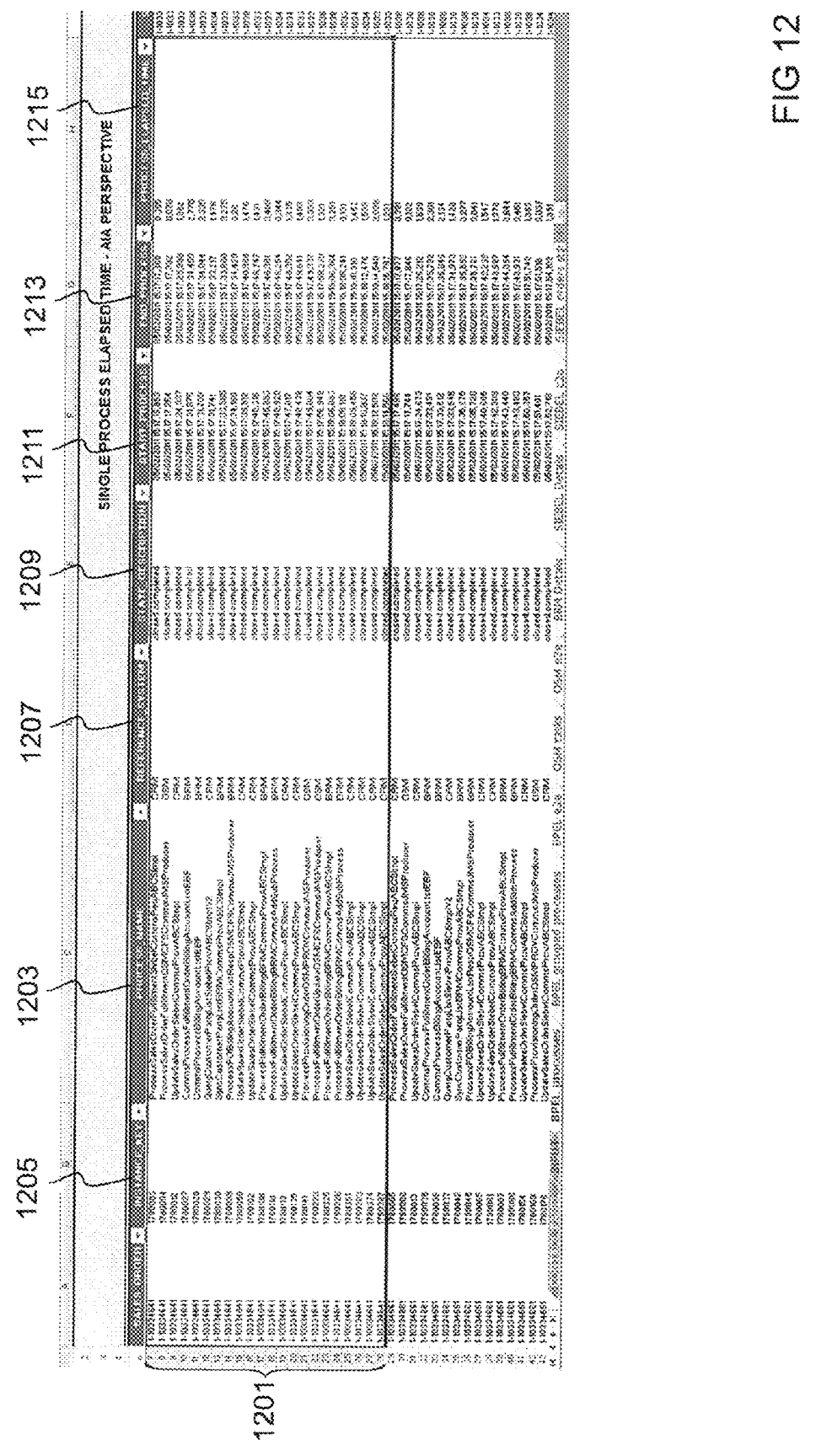

FIG. 12 shows an integration application action sheet. The depicted results can be obtained using the query discussed above with respect to FIG. 11.

According to the specific example depicted, the integration application is BPEL (also referred to as AIA) and the actions are referred to as BPEL processes. A highlighted portion 1201 shows 20 rows with primary order identifier 1-10334641. Each row has an action name in a process name column 1203.

Primary keys of at least one table in the integration database 101 can be found in the instance key column 1205. Application identifiers can be found in a reference column 1207. Action states can be found in a state description column 1209. Action start times can be found in a start process column 1211. Action end times can be found in an end process column 1213. Action durations can be found in a process elapsed time column 1215.

Figure 13:
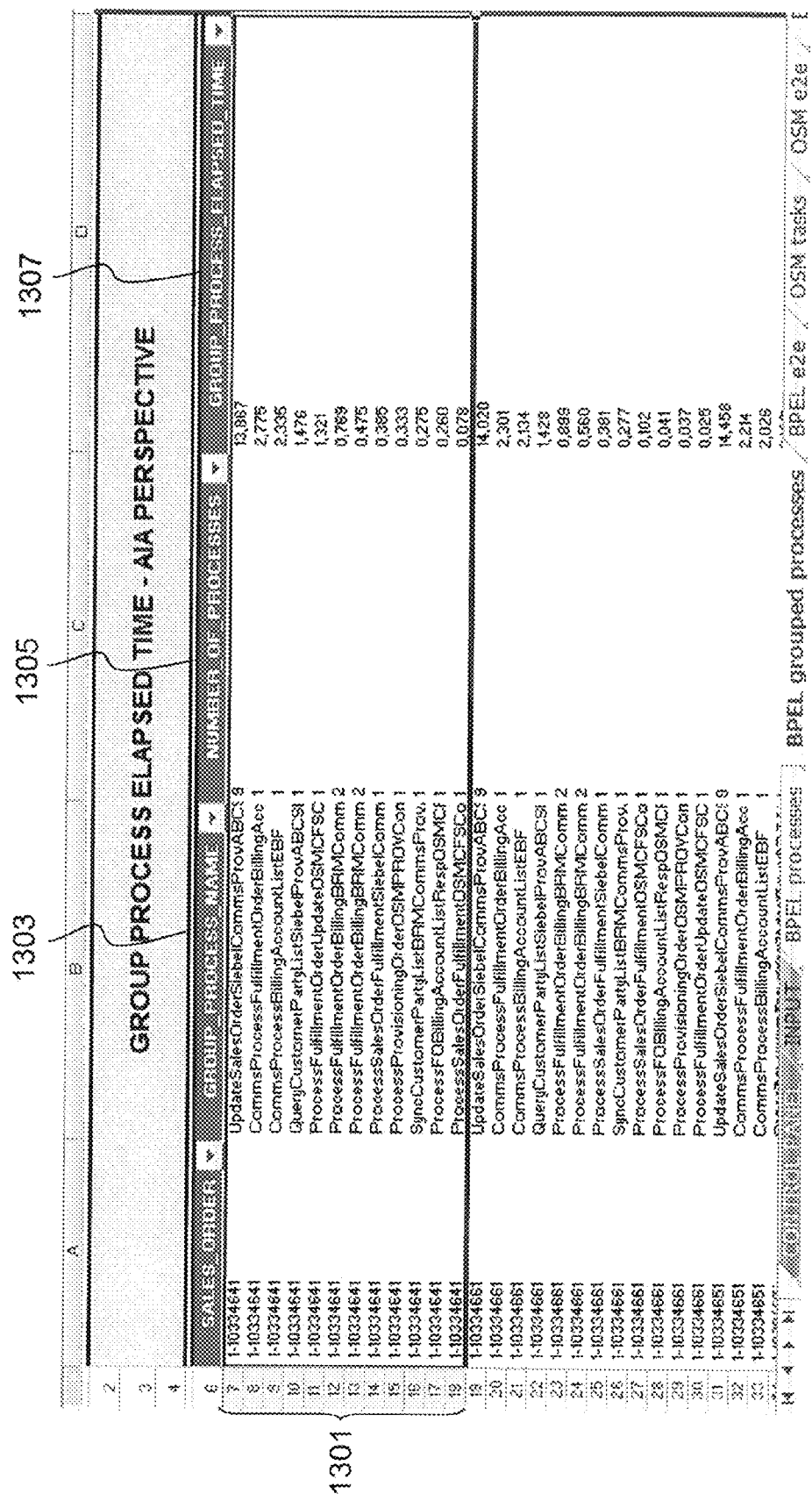
FIG. 13 shows a grouped process sheet depicting durations of actions invoked multiple times.

FIG. 13 shows a sheet depicting durations of grouped actions. The depicted durations can be obtained using the following query

```
SELECT     SUBSTR(TITLE,12) SALES_ORDER -- sales order
     ,BPEL_PROCESS_NAME GROUP_PROCESS_NAME
     ,COUNT(BPEL_PROCESS_NAME) NUMBER_OF_PROCESSES
     ,SUM((((EXTRACT (DAY FROM(MODIFY_DATE-
     CREATION_DATE)))*24*60*60)+((EXTRACT (HOUR
     FROM(MODIFY_DATE-CREATION_DATE)))*60*60)+((EXTRACT
     (MINUTE FROM(MODIFY_DATE-CREATION_DATE)))*60)+(EXTRACT
     (SECOND FROM(MODIFY_DATE-CREATION_DATE)))))
     GROUP_PROCESS_ELAPSED_TIME
FROM       BPEL_PROCESS_INSTANCES
WHERE      TITLE LIKE 'Sales Order 1-2002903%' -- ***** INPUT --> sales order
     AND STATE <> '9'
GROUP BY SUBSTR(TITLE,12), BPEL_PROCESS_NAME
ORDER BY GROUP_PROCESS_ELAPSED_TIME DESC
```

In some cases, actions invoked multiple times may be grouped together. Thus, some of the individual actions listed in FIG. 12 may be grouped together, as in FIG. 13. In the example of FIG. 13, the actions are referred to as processes and the integration application is referred to as BPEL or AIA. A highlighted portion 1301 shows 12 rows with the same primary order identifier, i.e. 1-10334641. The names of actions invoked multiple times can be found in a group process name column 1303. A number of processes column 1305 shows the number of times each action in the group of actions was invoked. Actions invoked multiple times may be aggregated and actions involved only one time may also be listed.

A group process elapsed time column 1307 shows group durations for actions invoked more than once, and individual durations for actions invoked only once. Each group duration may be calculated by summing the durations of all actions with the same name in the process name column 1203. In other words, the group duration may be calculated by summing the durations of all the invocations of an action.

Analyzing the duration of actions invoked more than once may make it possible to determine if an action is invoked too many times. In addition, the results of the query above may make it easier to determine that a single action (e.g. process) is taking too long, e.g. by putting all the invocations across the duration of an order into perspective.

Figure 14:
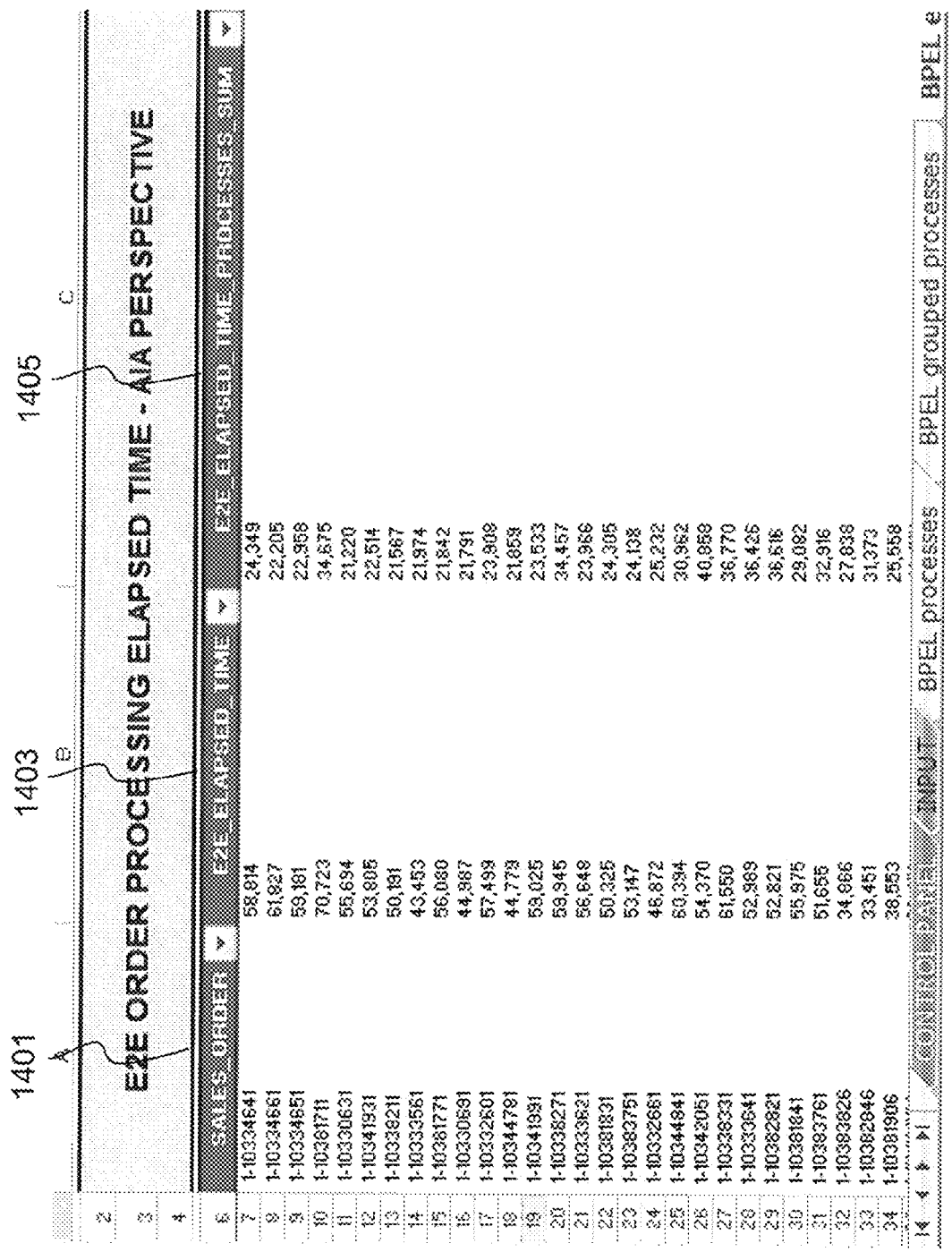
FIG. 14 shows results of calculating the duration of the processed request for a Business Process Execution Language application.

FIG. 14 shows order durations calculated in multiple ways. The depicted durations can be obtained using the following query above) in at least two ways: First, an elapsed duration maybe calculated by subtracting the start time of the first action from the end time of the last action having a given primary order identifier. Second, a summed duration may be calculated by summing all the durations of actions with a primary order identifier corresponding to the order. The summed duration may provide an overestimation of how long it takes to process the order, the elapsed duration may provide an underestimation. A difference in the durations calculated according to each calculation method may occur because not all actions have associated stored duration information. In particular, some actions are carried out do not have stored duration information that can be summed. The duration of such actions is accounted for by calculating the elapsed duration.

An e2e elapsed time column 1403 (e2e refers to end to end) includes elapsed order durations. An elapsed order duration may be calculated by subtracting an earliest timestamp of an earliest action having a primary order identifier (e.g. 1-10334641) from a latest timestamp of a latest action with the same primary order identifier. For example, the e2e elapsed time for primary order identifier 1-10334641 can be calculated by subtracting the first field in the start process column 1211, i.e. 05/02/2011 15:17:16,983 from the last entry of the end process column 1213 in the highlighted portion 1201, i.e. 05/02/2011 15:18:15,797. The result is 58,814, as shown in the first entry of the e2e elapsed time column 1403.

```
SELECT     SUBSTR(TITLE,12) SALES_ORDER -- sales order
     ,(MAX((((EXTRACT (DAY FROM(MODIFY_DATE)))*24*60*60) +
     ((EXTRACT (HOUR FROM(MODIFY_DATE)))*60*60)+((EXTRACT
     (MINUTE FROM(MODIFY_DATE)))*60)+(EXTRACT (SECOND
     FROM(MODIFY_DATE)))))-MIN((((EXTRACT (DAY
     FROM(CREATION_DATE)))*24*60*60)+((EXTRACT (HOUR
     FROM(CREATION_DATE)))*60*60)+((EXTRACT (MINUTE
     FROM(CREATION_DATE)))*60)+(EXTRACT (SECOND
     FROM(CREATION_DATE)))))) E2E_ELAPSED_TIME -- in seconds
     ,SUM(((EXTRACT (DAY FROM(MODIFY_DATE-
     CREATION_DATE)))*24*60*60)+((EXTRACT (HOUR
     FROM(MODIFY_DATE-CREATION_DATE)))*60*60)+((EXTRACT
     (MINUTE FROM(MODIFY_DATE-CREATION_DATE)))*60)+(EXTRACT
     (SECOND FROM(MODIFY_DATE-CREATION_DATE))))
     E2E_ELAPSED_TIME_PROCESSES_SUM -- in seconds
FROM BPEL_PROCESS_INSTANCES
WHERE TITLE LIKE 'Sales Order 1-2004804' -- ***** INPUT --> sales order
     AND STATE <> '9'
GROUP BY SUBSTR(TITLE,12)
```

An order may be processed by executing all the actions with the same primary order identifier. For example, as depicted in FIG. 12, there are 22 actions associated with primary order identifier 1-10334641. As sales order column 1401 contains primary order identifiers.

The duration of an order (i.e. the duration of a processed order) may be calculated (e.g. via queries such as the example A summed duration may be calculated by summing all the durations of the actions with the primary order identifier. For example, in FIG. 14 summed durations are shown in an e2e elapsed time processes sum column 1405. In a specific example, the summed duration for the order with primary order identifier 1-10334641 can be calculated by adding together all the values in the process elapsed time column 1215 in the highlighted portion 1201. Accordingly, the total is 24,349, as shown in the first entry of the e2e elapsed time processes sum column 1405.

FIG. 15 shows results of a query of stored duration information in the OSM database 107. Rows with primary order identifier "1-461383" may be retrieved using the following query:

```
SELECT OI.NODE_VALUE_TEXT SALES_ORDER
    ,OHIST.ORDER_SEQ_ID SEQUENCE_ID
    ,OHIST.TASK_ID
    ,MIN(OT.TASK_DESCRIPTION) TASK_DESCRIPTION
    ,MIN(OHIST.TIMESTAMP_IN) START_TASK
    ,MAX(OHIST.TIMESTAMP_IN) END_TASK
    ,ROUND((MAX(OHIST.TIMESTAMP_IN) -
     MIN(OHIST.TIMESTAMP_IN))*24*60*60) TASK_ELAPSED_TIME
FROM      OM_HIST$ORDER_HEADER OHIST, OM_TASK OT,
OM_ORDER_INSTANCE OI,      OM_ORDER_SOURCE OS
WHERE OHIST.ORDER_SEQ_ID=OI.ORDER_SEQ_ID
    AND OHIST.TASK_ID=OT.TASK_ID
    AND OI.ORDER_SOURCE_ID=OS.ORDER_SOURCE_ID
    AND OI.NODE_VALUE_TEXT='1-461383'
    AND OS.ORDER_SOURCE_MNEMONIC='CommunicationsSalesOrder'
    AND OHIST.TASK_TYPE IN ('A','R')
GROUP BY OI.NODE_VALUE_TEXT, OHIST.ORDER_SEQ_ID, OHIST.TASK_ID
ORDER BY OHIST.ORDER_SEQ_ID, MIN(OHIST.TIMESTAMP_IN), OHIST.TASK_ID
```

Primary order identifiers can be found in a sales order column 1501. As discussed above, the "SEQUENCE_ID" ("OHIST.ORDER_SEQ_ID") in the query above is an example of a secondary order identifier. The sequence ID can be input directly into the OSM application.

Conditions specified in a query of stored duration information, such as the query above, may include conditions under which relations are joined and/or one or more filters. The filters may specify a primary order identifier (e.g. in the form of a variable that can hold the value of each primary order identifier in the input sheet), a data type, or an object characteristic.

A task id column 1503 shows a list of OSM task identifiers. A task may be understood to refer to an action in the context of the OSM database 107. A task identifier, such as one of the task identifiers shown in the task identifier column 1503, is the primary key of at least one table in the OSM database 107. A start task column 1505 shows a list of actions start times. An end task column 1507 shows a list of action end times. A task elapsed time column 1509 shows a list of action durations.

A highlighted portion 1511 shows stored duration information associated with primary order identifier 1-10334641. The stored duration information in the highlighted portion 1511 was retrieved from the OSM database 107 via one or more queries.

FIG. 16 shows order durations obtained by querying the OSM database 107. The order durations can be obtained by means of the following query:

```
SELECT      NODE_VALUE_TEXT SALES_ORDER -- sales order
    ,UPPER(MNEMONIC) STATUS
    ,ROUND(((DECODE(ORD_STATE_ID, '7', ORD_COMPLETION_DATE,
NULL)         - ORD_CREATION_DATE))*24*60*60) E2E_ELAPSED_TIME -- in
seconds
FROM OM_ORDER_HEADER OH, OM_OSPOLICY_STATE OSP,
    OM_ORDER_INSTANCE OI, OM_ORDER_SOURCE OS
WHERE       OH.ORD_STATE_ID = OSP.ID
    AND OH.ORDER_SEQ_ID=OI.ORDER_SEQ_ID
    AND OI.ORDER_SOURCE_ID=OS.ORDER_SOURCE_ID
    AND OI.NODE_VALUE_TEXT='1-461383' -- ***** INPUT --> sales order
    AND OS.ORDER_SOURCE_MNEMONIC='CommunicationsSalesOrder'
    AND ROWNUM=1
```

Elapsed durations are shown in an e2e elapsed time column 1601. Primary order identifiers and a status of all actions associated with the same primary order identifier are also depicted. The elapsed durations in the e2e elapsed time column 1601 are calculated by subtracting an earliest timestamp of an earliest action with the primary order identifier from a latest timestamp of a latest action with the primary order identifier, as discussed with regard to FIG. 14.

Figure 17:
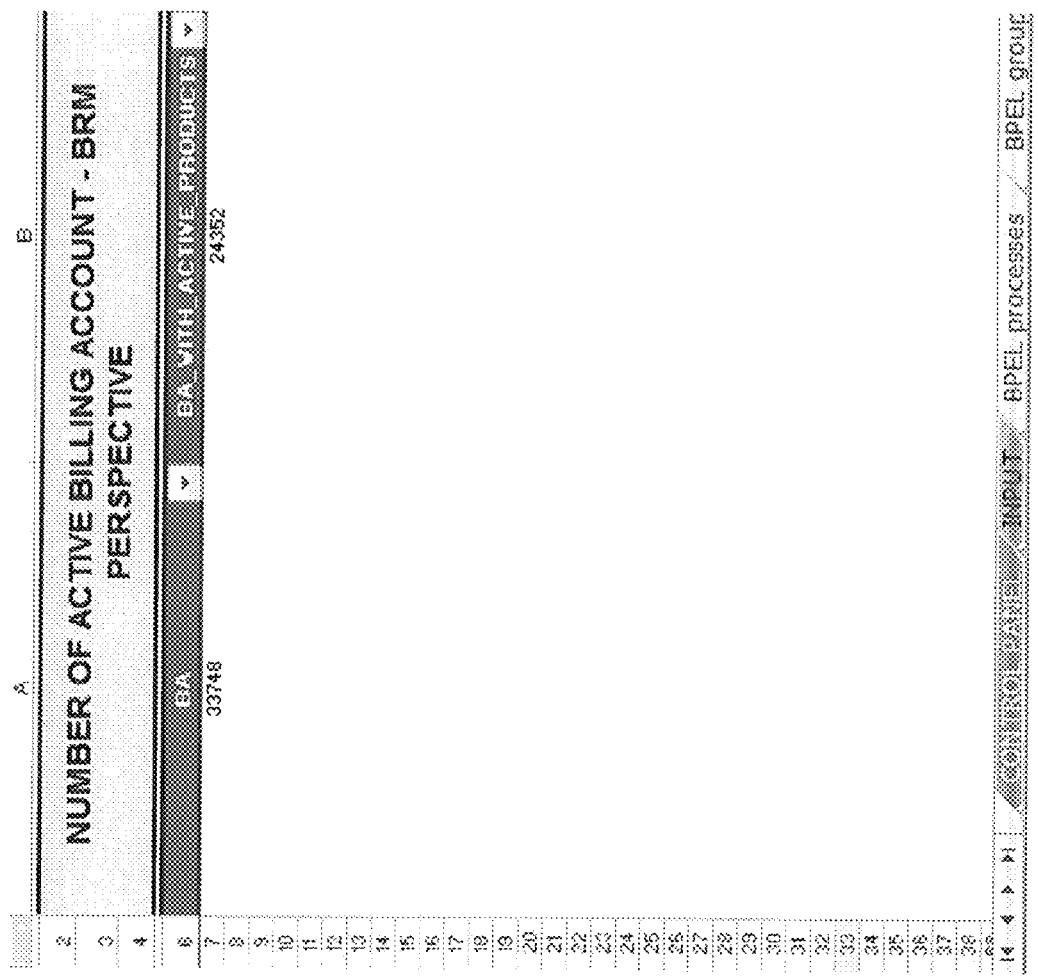
FIG. 17 depicts a state of an application database corresponding to a billing and revenue management application.

FIG. 17 shows results of a query of the BRM database 105. The number of active billing accounts (labeled as "BA" with a value of "33748") can be obtained using the following query:

```
SELECT COUNT (DISTINCT ACCOUNT_NO) AS BA
FROM PIN.ACCOUNT_T
WHERE STATUS = 10100;
```

The number of active billing account with active products (labeled as "BA_WITH_ACTIVE_PRODUCTS" with a value of "24352") can be obtained with the following query:

```
SELECT COUNT(DISTINCT ACCOUNT_NO) AS
BA_WITH_ACTIVE_PRODUCTS
FROM PIN.ACCOUNT_T A, PIN.PURCHASED_PRODUCT_T PPT
WHERE A.POID_ID0 = PPT.ACCOUNT_OBJ_ID0
    AND A.STATUS = 10100
    AND PPT.STATUS = 1;
```

When an order is submitted to the CRM application, it may be helpful to determine if a corresponding billing profile has been created in the BRM database 105, so that it can be determined if the product associated with the order has reached the BRM database 105. Thus, the queries described with respect to FIG. 17 can be used to calculate the number of billing profiles in the BRM database 105 and the number of billing profiles with active products.

The depicted results indicate a number of billing profiles in the BRM database 105 and a number of billing profiles associated with items (e.g. products). A billing profile may be understood as an entity that identifies a customer in the BRM database 105. This queries given above can be used before an order submission and after the submitted orders have been processed. The queries may be particularly useful in the case of a large submission of orders, e.g. over 1000. By subtracting the values obtained from execution of the queries before the orders were processed from the values obtained from execution of the queries after the orders were processed, it is possible to determinate how many orders submitted from the CRM application have reached the BRM application. This may be have the advantage of helping to locate errors, e.g. orders that could not be processed completely or further actions that need to be carried out.

Orders are processed by the CRM application and the corresponding CRM database 103, the AIA application and the corresponding integration database 101 and the OSM application and corresponding OSM database 107 before reaching the BRM database 105. Thus, running the queries above to obtain results depicted corresponding to those depicted in FIG. 17 may provide an indication of how well applications and databases are functioning, i.e. give insight into the state of multiple computers, applications, and databases.

Figure 18:
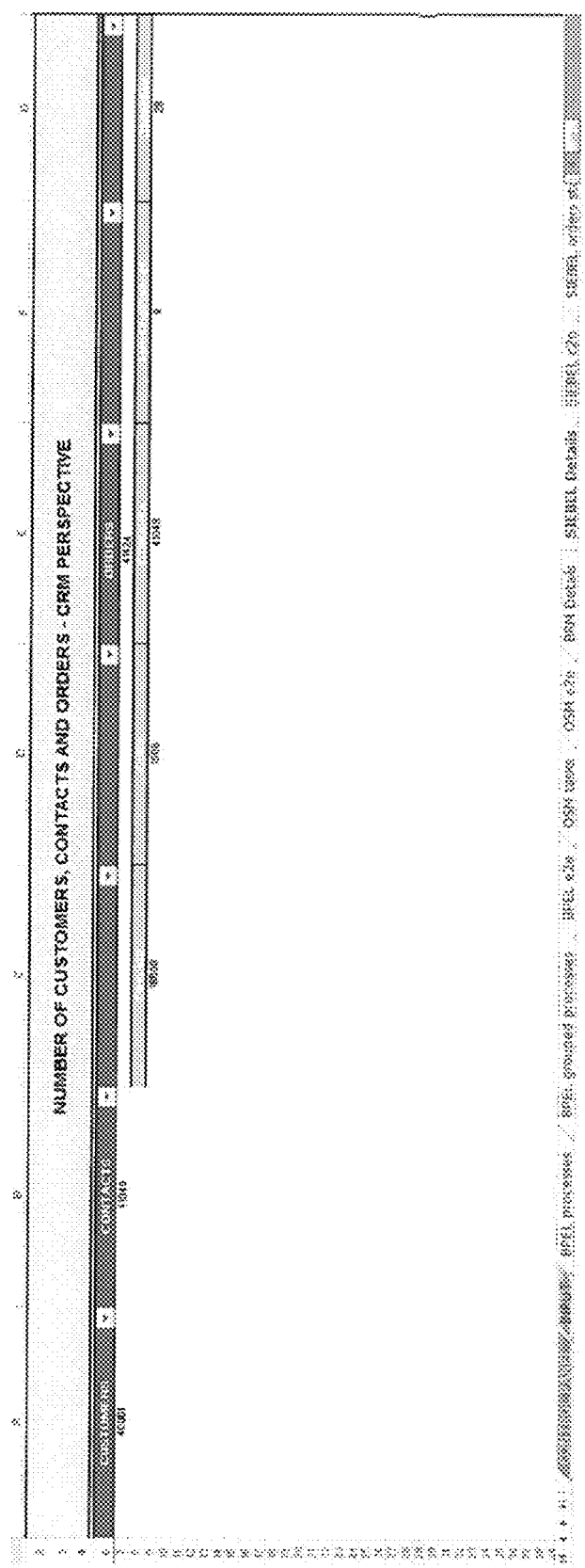
FIG. 18 depicts a state of an application database corresponding to a customer relationship management application.

FIG. 18 shows results of a query of the CRM database 103. The results may be obtained using the following queries.

In particular, a number of customers (with a value of "40001" under "CUSTOMERS") may be obtained as follows:

```
SELECT COUNT(A.NAME) AS NUMBER_OF_CUSTOMERS
FROM SIEBEL.S_ORG_EXT A, SIEBEL.S_ORG_EXT B
WHERE A.ROW_ID = B.PAR_ROW_ID
  AND (B.INT_ORG_FLG <> 'Y' OR B.PRTNR_FLG <> 'N')
  AND B.ACCNT_FLG <> 'N' ORDER BY A.CUST_STAT_CD;
```

A number of contacts (with a value of "41049" under "CONTACTS") may be obtained as follows:

```
SELECT COUNT(*) AS NUMBER_OF_CONTACTS
FROM SIEBEL.S_CONTACT;
```

A number of orders (with a value of "41424" under "ORDERS") may be obtained as follows:

```
SELECT COUNT(*) AS NUMBER_OF_ORDERS
FROM SIEBEL.S_ORDER;
```

A number of pending orders (with a value of "16500" under "Pending") may be obtained as follows:

```
SELECT COUNT(*) AS PENDING_ORDERS
FROM SIEBEL.S_ORDER
WHERE STATUS_CD='Pending';
```

A number of open orders (with a value of "1508" under "Open") may be obtained as follows:

```
SELECT COUNT(*) AS OPEN_ORDERS
FROM SIEBEL.S_ORDER
WHERE STATUS_CD='Open';
```

A number of complete orders (with a value of "41049" under "Complete") may be obtained as follows:

```
SELECT COUNT(*) AS COMPLETE_ORDERS
FROM SIEBEL.S_ORDER
WHERE STATUS_CD='Complete';
```

A number of pending cancel orders (with a value of "8" under "Pending Cancel") may be obtained as follows:

```
SELECT COUNT(*) AS PENDING_CANCEL_ORDERS
FROM SIEBEL.S_ORDER
WHERE STATUS_CD='Pending Cancel';
```

A number of cancelled orders (with a value of "28" under "Cancelled") may be obtained as follows:

```
SELECT COUNT(*) AS NUMBER_OF_CANCELLED_ORDERS
FROM SIEBEL.S_ORDER
WHERE STATUS_CD='Cancelled';
```

The 8 queries shown above for FIG. 18 can be used to monitor the CRM database 103. In particular, information regarding customers and contacts is shown, i.e. the number of customer accounts and the number of contacts. In addition, information regarding orders, i.e. the number of orders, and order status (e.g. pending, open, complete, pending cancel, and canceled) is also shown in particular, the total number of orders is shown and the total number of orders in each order status is also shown.

Figure 19:
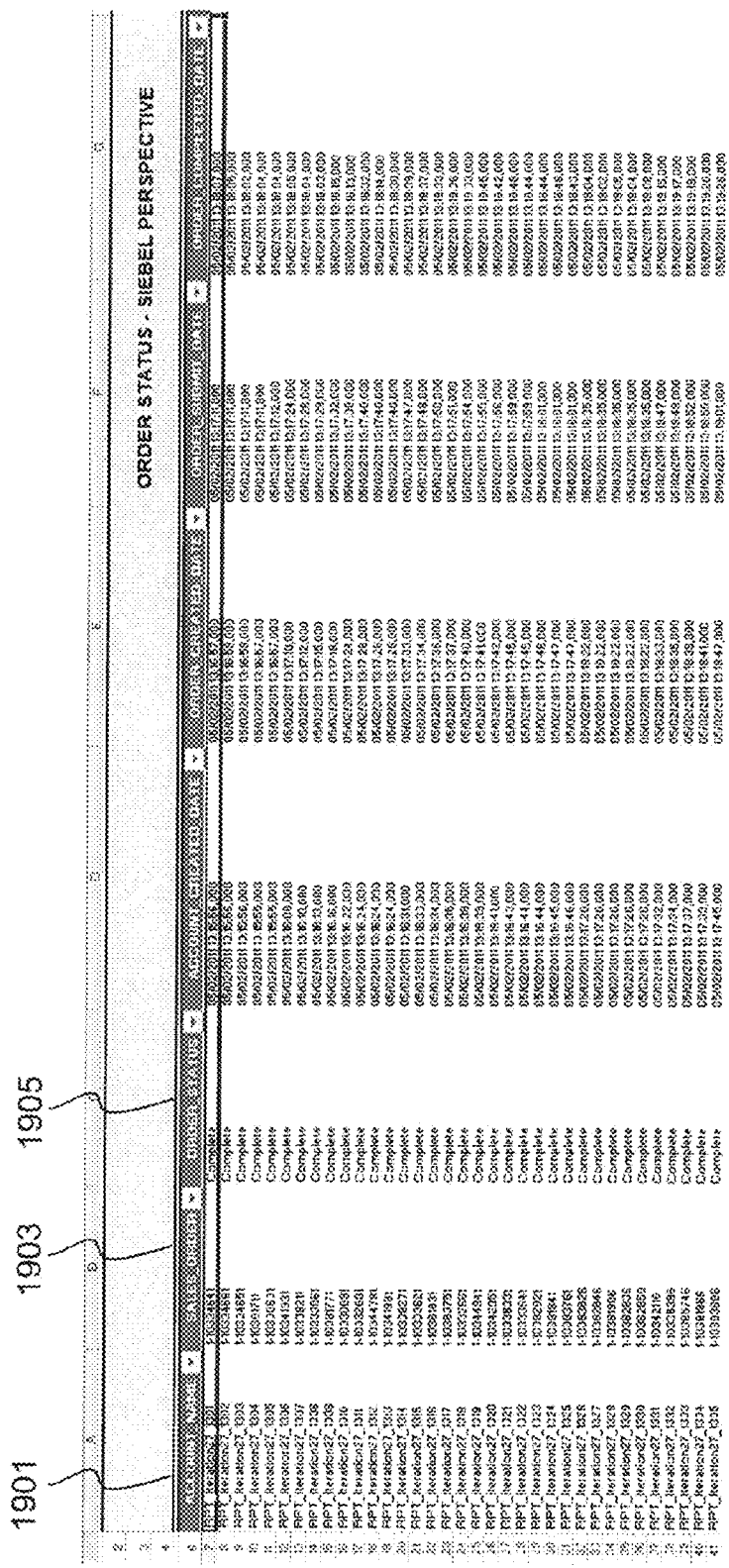
FIG. 19 depicts results of querying the application database associated with the customer relationship management application.

FIG. 19 depicts results of querying the CRM database 103. The results depicted in FIG. 19 may be obtained using the following query:

```
SELECT
    org.name AS ACCOUNT_NAME,
    ord.order_num AS SALES_ORDER,
    ord.status_cd AS ORDER_STATUS,
    org.created AS ACCOUNT_CREATED_DATE,
    ord.created AS ORDER_CREATED_DATE,
    ord_date.submit_dt AS ORDER_SUBMIT_DATE,
    ord_line.COMPLETED_DT AS ORDER_COMPLETED_DATE,
    (ord.created – org.created)*24*60*60 AS
        ACCOUNT_CREATED_TIME,
    (ord_date.submit_dt – ord.created)*24*60*60 AS
        ORDER_CREATED_TIME,
    (ord_line.COMPLETED_DT – ord_date.submit_dt)*24*60*60 AS
        ORDER_COMPLETED_TIME,
    --,SUM ((ord.created – org.created)*24*60*60 +
    (ord_date.submit_dt – ord.created)*24*60*60 +
    (ord_line.COMPLETED_DT – ord_date.submit_dt)*24*60*60)
        AS E2E_ELAPSED_TIME
FROM
    siebel.s_order ord,
    siebel.s_org_ext org,
    siebel.S_ORDER_DTL ord_date,
    siebel.s_order_item ord_line
```

-continued

```
WHERE
    ord.order_num = '1-8197871'
    AND org.par_row_id = ord.ACCNT_ID
    AND ord_date.par_row_id = ord.row_id
    AND ord_line.order_id = ord.row_id
    AND (ORD_LINE.ROOT_ORDER_ITEM_ID =
    ord_line.row_id and ord_line.PROM_INTEG_ID is null)
```

Thus, with reference to the query above, siebel.s_order-.order_num (SALES_ORDER) is a primary key of the CRM database 103. In addition, the values in the siebel.s_order.order_num (SALES_ORDER) column are primary order identifiers. Also, OM_HIST$ORDER_HEADER.Task_ID (OHIST.TASK_ID) is a primary key of the OSM database The query above leverages the hierarchical structure of items in an order, which includes parent line items and child line items. Exemplary conditions of the "WHERE" clause above (i.e. conditions that may be used in a query of stored duration information) specify the ORDER_COMPLETED_DATE ("ord_line.COMPLETED") as the date when the root item of the order was completed.

The query above shows a line beginning with ",SUM" commented out with "—". In the context of the exemplary query above, Mircosoft Excel is used to calculate elapsed duration by adding the "ACCOUNT_CREATED_TIME", "ORDER_CREATED_TIME", and "ORDER_COMPLETED_TIME" from the attributes of the select list above. Alternatively, the comment could be removed and the elapsed duration calculated via the query expression.

An account name column shows account identifiers that can be used to uniquely identify orders or to obtain order identifiers. A sales order column 1903 shows primary order identifiers that can be used to uniquely identify orders. An order status column 1905 shows a status of the actions performed in order to process the corresponding order. The further columns depicted in FIG. 19 show significant dates (i.e. timestamps indicating when an event occurred) in the processing of each order.

Figure 20:
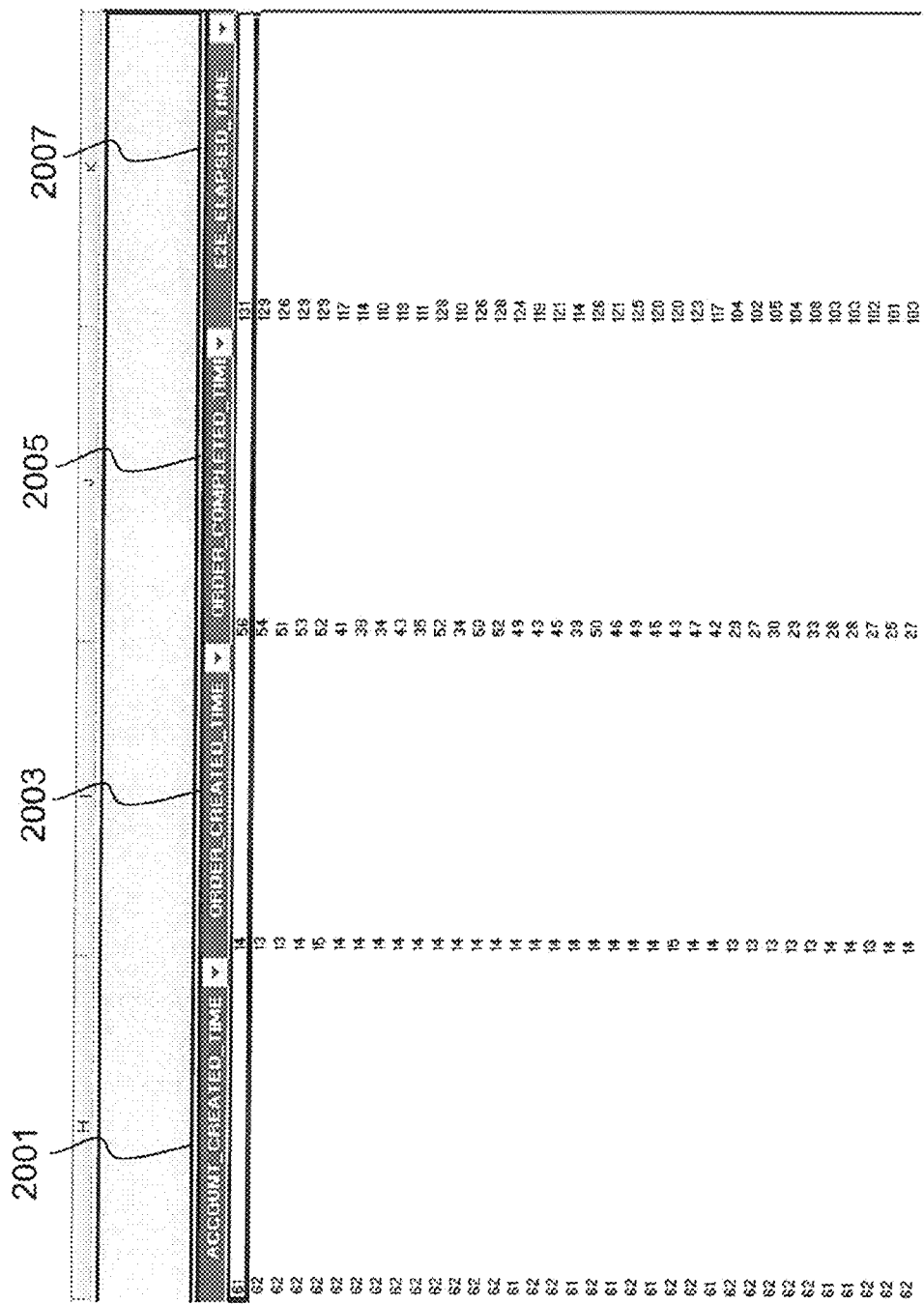
FIG. 20 depicts application execution durations for the customer relationship management application.

FIG. 20 shows order duration information.

The order duration information can be calculated using the query described with respect to FIG. 19. In particular, an account created time column 2001 shows the difference between an order created date and an account created date. An order created time column 2003 shows a difference between an order submit date and an order created date (i.e. the order created time column 2003 shows the order created date subtracted from the order submit date). An order completed time column 2005 shows a difference between an order completed date and an order submit date. The order created date, order submit date, and account created date refer to attributes of tables in the CRM database 103. A field of an e2e elapsed time column 2007 is a summation of the values in the corresponding fields (i.e. fields in the same row) of the account created time column 2001, the order created time column 2003, and the order completed time column 2005.

The elapsed times retrieved from the CRM database 103, shown in the e2e elapsed time column 2007, are greater than elapsed times retrieved the integration database 101 or the OSM database 107 because the elapsed times retrieved from the CRM database 103 include stored duration information logged before a primary order identifier is established (e.g. initial account and order configuration), whereas the stored duration information in the integration database 101 and the OSM database 107 only includes duration information for an order that was stored after the primary order identifier was established.

Figure 21:
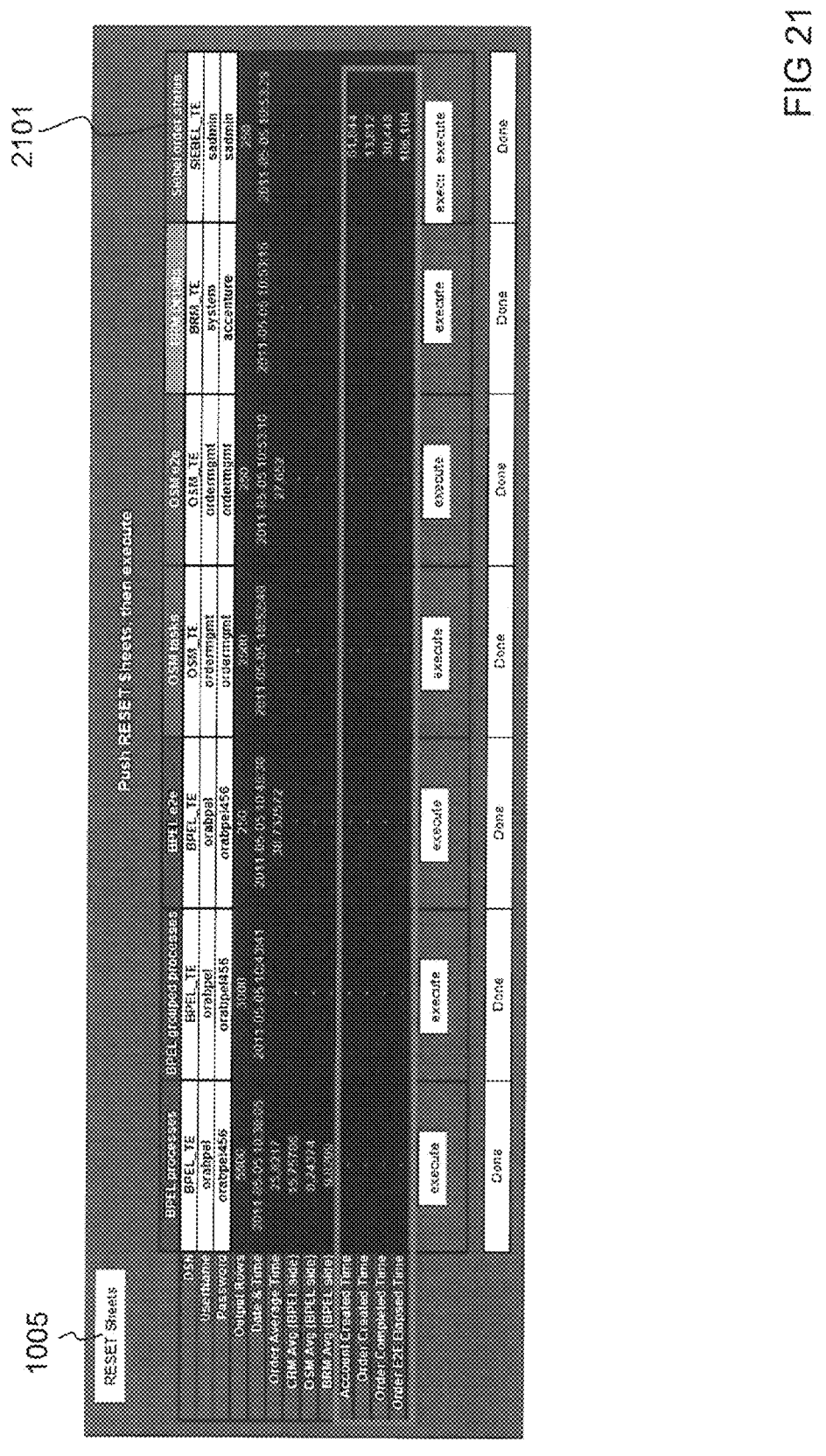

FIG. 21 also depicts the control panel of the PTT.

In an order status column 2101, information is included that can be used to determine whether to carry out a performance improvement. An example of the performance improvement is a reduction in a duration, e.g. order duration, request processing duration, action duration, or application execution duration. The values in the order status column 2101 include an average account creation time, an average order creation time, an average order completion time, and an e2e (end to end) order elapsed time. The e2e order elapsed time reflects a summation of the account creation duration, the order creation duration, and the order completion duration. In the specific example depicted in FIG. 21, the average account creation duration is 61,844, the average order creation duration is 13,812, and the average order completion duration is 30,448. Adding these durations together results in the average end to end order duration of 106,104.

When the average durations discussed above do not match expected values, durations associated with each application can be analyzed.

Figure 22:
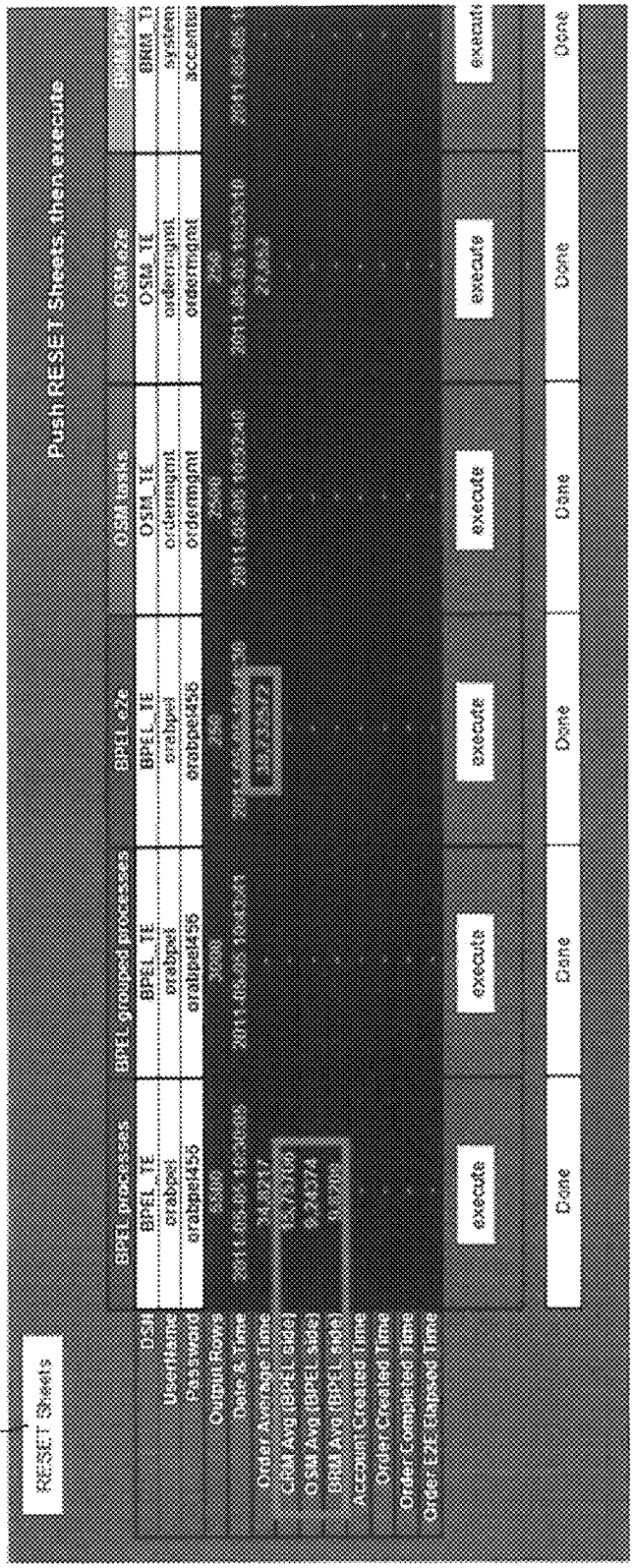
FIG. 22 highlights aspects of result information that can be reviewed to determine performance bottlenecks.

FIG. 22 shown yet another depiction of the control panel of the PTT.

Assuming that the average durations discussed with respect to FIG. 21 do not match expected values, it may be advisable to analyze order and application durations.

In FIG. 22, two e2e (end to end) durations are displayed, an integration (or BPEL) e2e duration (i.e. an elapsed duration in this context) of "38,732572" is shown and highlighted. In addition, an OSM e2e duration of "27,652" is shown. The "Order Average Time" for the integration application (BPEL) is "34,8217" which is less than the integration e2e duration because the integration e2e duration accounts for queuing and message processing.

In addition, duration of interaction of the integration application (BPEL) with other applications when processing an order is shown. Specifically, according to the example depicted, the average duration of interaction of the integration application with the CRM application when processing an order is "15,75706", average duration of interaction with the OSM application is "9,24374", and average duration of interaction with the BRM application is "9,8209".

Figure 23:
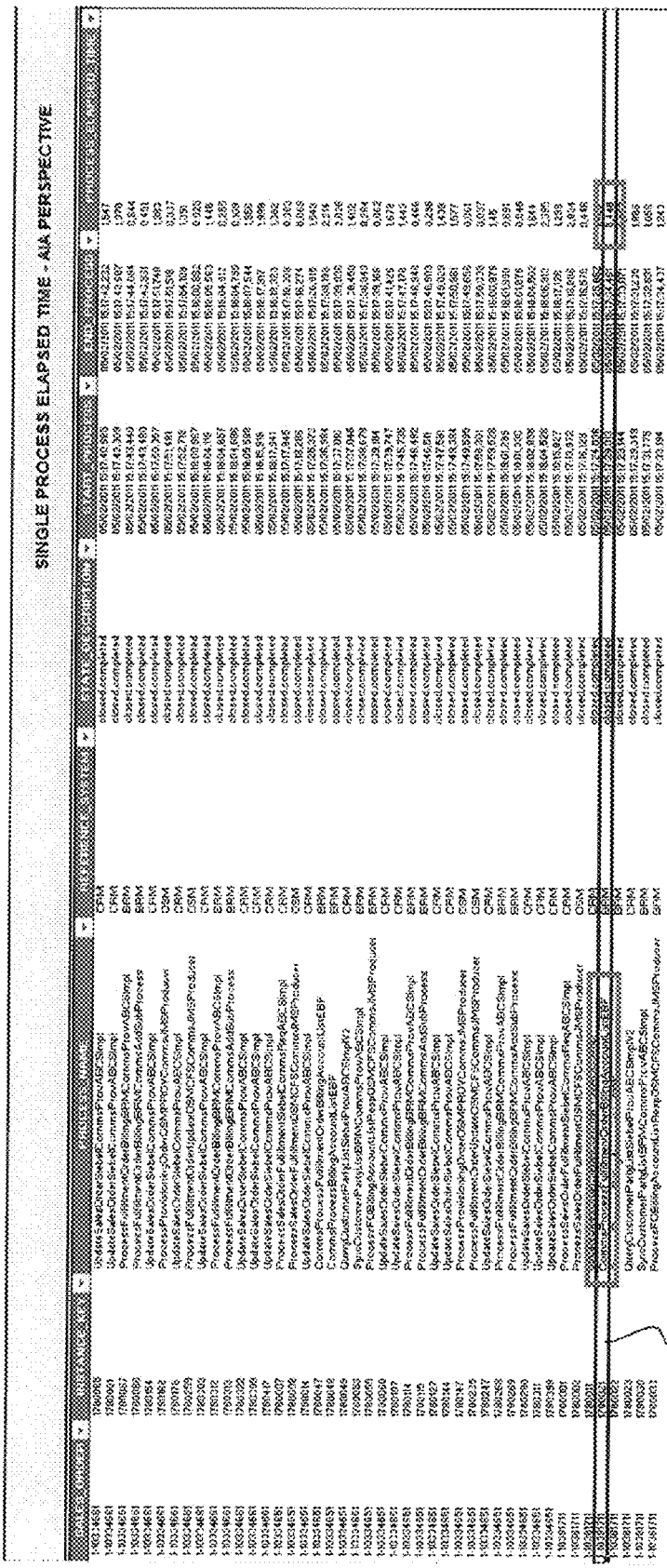
FIG. 23 identifies a specific action for performance improvement.

FIG. 23 depicts a result sheet generated via a query of the integration database 101. An identified action 2301 with a primary order identifier of 1-10381711 and performed by the integration application (when interacting with the BRM application) shows an elapsed duration of 5,448. Thus, by identifying a single action responsible for a significant part (e.g. more than 3 seconds or more than 5 seconds) of the total order duration, it is possible to focus performance improvement efforts where they will be useful and bring about the best results. In particular, among hundreds of orders and thousands of actions it is possible to identify a single action or just a few actions that can be improved in order to have a significant impact on overall performance.

The PTT provides performance information about requests and orders processed within a combination or heterogeneous applications (e.g. RODOD). Details of response times of the various applications and even individual actions (e.g. processes, subprocesses, and tasks) can be easily gathered. Even among thousands of orders and hundreds of thousands of individual actions, the causes of performance problems or bottlenecks can be easily detected. Accordingly, the use of PTT can bring reality closer to what is expected.

FIG. 24 shows a TNSNAMES configuration file.

The TNSNAMES configuration file can be used by the PTT to determine how to connect to a database source. PTT may be implemented using Microsoft Excel and Visual Basic for Applications (VBA). SQL queries in the Visual Basic code may access an Oracle database using Oracle Database connections (ODBC) and Oracle Client Home. In a specific example, the TNSNAMES file depicted in FIG. 24 maybe stored in the following directory:

C:\oracle\product\10.2.0\client_
1\network\ADMIN\tnsnames.ora

Figure 25:
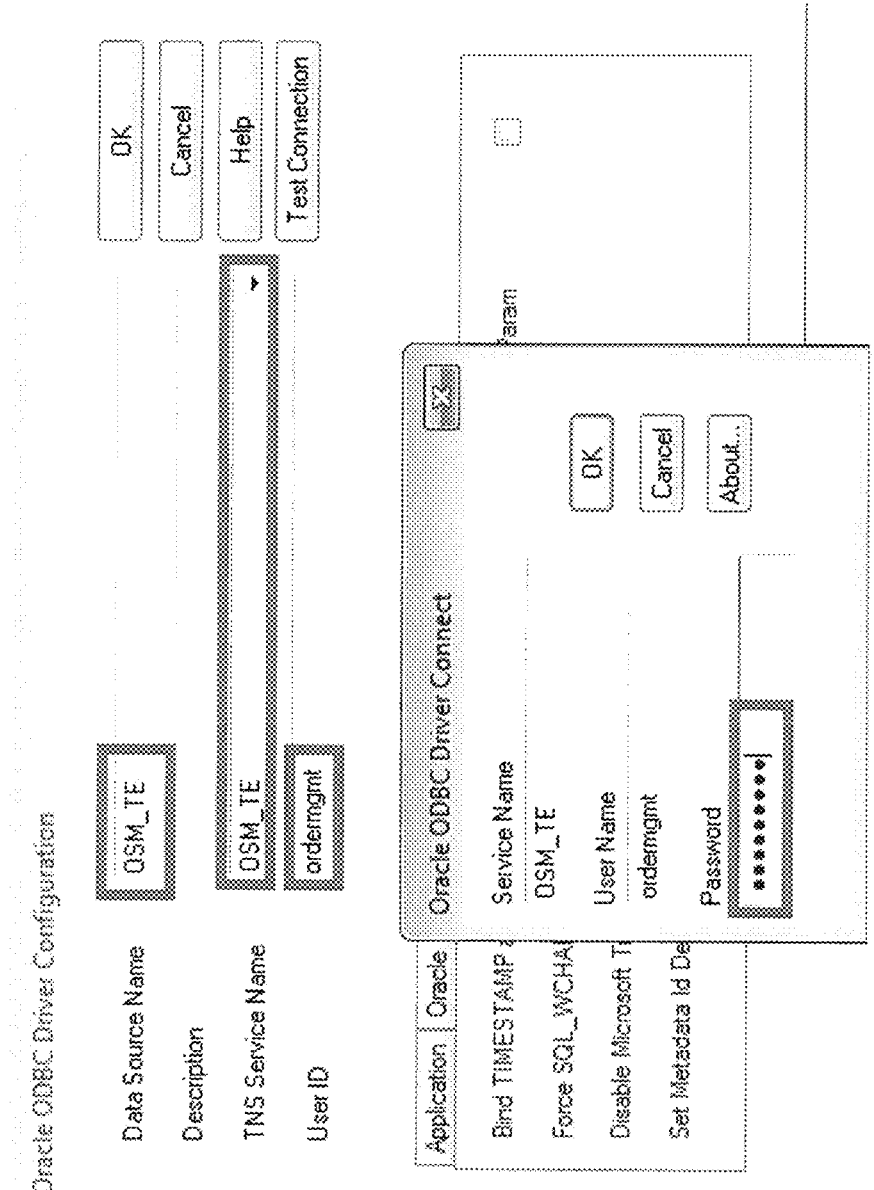
FIG. 25 shows data source and login information that can be used by the client computer.

FIG. 25 shows an example of how connection information for the OSM database 107 can be entered into Oracle client dialogue boxes.

Figure 26:
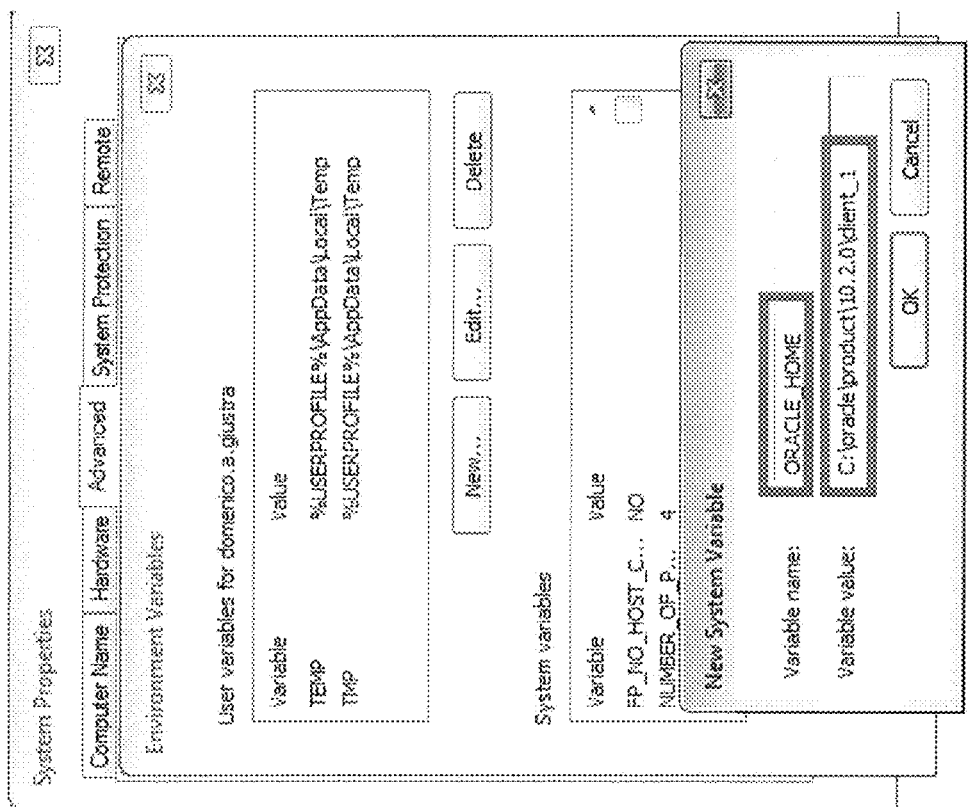
FIG. 26 shows database environment information that can be used by the client computer.

FIG. 26 shows dialogue boxes depicting an exemplary value for an Oracle_Home Environment Variable.

FIG. 27 shows an exemplary system for implementing the claimed subject matter including a general purpose computing device in the form of a conventional computing environment 2720 (e.g. a personal computer). The conventional computing environment includes a processing unit 2722, a system memory 2724, and a system bus 2726. The system bus couples various system components including the system memory 2724 to the processing unit 2722. The processing unit 2722 may perform arithmetic, logic and/or control operations by accessing the system memory 2724. The system memory 2724 may store information and/or instructions for use in combination with the processing unit 2722. The system memory 2724 may include volatile and non-volatile memory, such as a random access memory (RAM) 2728 and a read only memory (ROM) 2730. A basic input/output system (BIOS) containing the basic routines that helps to transfer information between elements within the personal computer 2720, such as during start-up, may be stored in the ROM 2730. The system bus 2726 may be any of several types of bus structures including a memory bus or memory controller, a peripheral bus, and a local bus using any of a variety of bus architectures.

The personal computer 2720 may further include a hard disk drive 2732 for reading from and writing to a hard disk (not shown), and an external disk drive 2734 for reading from or writing to a removable disk 2736. The removable disk may be a magnetic disk for a magnetic disk driver or an optical disk such as a CD ROM for an optical disk drive. The hard disk drive 2732 and the external disk drive 2734 are connected to the system bus 2726 by a hard disk drive interface 2738 and an external disk drive interface 2740, respectively. The drives and their associated computer-readable media provide non-volatile storage of computer readable instructions, data structures, program modules and other data for the personal computer 2720. The data structures may include relevant data for the implementation of the method for calculating the duration of an action, as described above. The relevant data may be organized in a database, for example a relational or object database.

Although the exemplary environment described herein employs a hard disk (not shown) and an external disk 2736, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 2736, ROM 2730 or RAM 2728, including an operating system (not shown), one or more application programs 2744, other program modules (not shown), and program data 2746. The application programs may include at least a part of the functionality as depicted in FIGS. 1 to 27.

A user may enter commands and information, as discussed below, into the personal computer 2720 through input devices such as keyboard 2748 and mouse 2750. Other input devices (not shown) may include a microphone (or other sensors), joystick, game pad, scanner, or the like. These and other input devices may be connected to the processing unit 2722 through a serial port interface 2752 that is coupled to the system bus 2726, or may be collected by other interfaces, such as a parallel port interface 2754, game port or a universal serial bus (USB). Further, information may be printed using printer 2756. The printer 2756, and other parallel input/output devices may be connected to the processing unit 2722 through parallel port interface 2754. A monitor 2758 or other type of display device is also connected to the system bus 2726 via an interface, such as a video input/output 2760. In addition to the monitor, computing environment 2720 may include other peripheral output devices (not shown), such as speakers or other audible output.

The computing environment 2720 may communicate with other electronic devices such as a computer, telephone (wired or wireless), personal digital assistant, television, or the like. To communicate, the computer environment 2720 may operate in a networked environment using connections to one or more electronic devices. FIG. 27 depicts the computer environment networked with remote computer 2762. The remote computer 2762 may be another computing environment such as a server, a router, a network PC, a peer device or other common network node, and may include many or all of the elements described above relative to the computing environment 2720. The logical connections depicted in FIG. 27 include a local area network (LAN) 2764 and a wide area network (WAN) 2766. Such networking environments are commonplace in offices, enterprise-wide computer networks, intranets and the Internet and may particularly be encrypted.

When used in a LAN networking environment, the computing environment 2720 may be connected to the LAN 2764 through a network I/O 2768. When used in a WAN networking environment, the computing environment 2720 may include a modem 2770 or other means for establishing communications over the WAN 2766. The modem 2770, which may be internal or external to computing environment 2720, is connected to the system bus 2726 via the serial port interface 2752. In a networked environment, program modules depicted relative to the computing environment 2720, or portions thereof, may be stored in a remote memory storage device resident on or accessible to remote computer 2762. Furthermore other data relevant to performance test tool (described above) may be resident on or accessible via the remote computer 2762. It will be appreciated that the network connections shown are exemplary and other means of establishing a communications link between the electronic devices may be used.

The above-described computing system is only one example of the type of computing system that may be used to implement the method for calculating the duration of an action.

The claimed subject matter may lead to a number of effects and advantages. In particular, queries according to the claimed subject matter can be used to quickly and accurately determine performance bottlenecks and improve database and application response times. Thus, application and database performance can be improved by identifying unnecessary actions (i.e. removing unused or unneeded functionality), redesigning workflows (e.g. executing a different set of actions in order to accomplish a particular goal), or changing decomposition rules (such rules may impact actions, e.g. OSM tasks). Also, in view of the identification of significant performance data, it may be possible to redesign actions (e.g. processes or subprocesses) within the integration application.

Accordingly, the claimed subject matter has the technical effect of efficiently identifying the location of duration data within all RODOD applications. Moreover, the claimed subject matter has the technical effect of determining the correct attributes to be extracted from the integration database 101, the CRM database 103, the BRM database 105, and the OSM database 107 in order to determine how performance within RODOD can be improved. Thus, it is possible to identify of specific actions (e.g. subprocesses or tasks) within each application for the specific order being analyzed. Moreover, the claimed subject matter supports performance analysis of a single order or a large number of orders (e.g. over a thousand).

According to an aspect, a computer implemented method of calculating a duration of an action is provided. The action comprises at least one database operation and the action is one of multiple actions carried out in order to process a request. Processing the request may include executing multiple applications, each application having a corresponding application database. The execution of one of the applications includes performing the action on the corresponding application database and storing duration information for the action.

The method may comprise determining a primary order identifier of the action. In addition, the method may comprise deriving at least one secondary order identifier by means of the primary order identifier. A plurality of secondary order identifiers may be associated with the primary order identifier. Moreover, the method may comprise querying the stored duration information. The querying may comprise specifying a proper subset of attributes of one or more relations, the relations including at least one table, each relation including a plurality of rows. There may be a plurality of relations. The attributes may describe the primary order identifier. The attributes may further describe the secondary order identifier. Also, the attributes may describe a subset of the duration information including an action start time. The subset of the duration information may further include an action end time. The subset of the duration information may be a proper subset.

The querying may further comprise specifying conditions that must be met by at least one row of the relations, wherein at least one condition includes attributes of multiple relations. The querying may further comprise retrieving, according to the conditions, the specified attributes of the at least one row of the relations. Moreover, the querying may comprise calculating a duration of the action based on the retrieved start time of the action and the retrieved end time of the action.

In some cases, determining the primary order identifier comprises receiving the primary order identifier. Alternatively, determining the primary order identifier comprises receiving an account identifier and determining the primary order identifier by means of the account identifier.

Furthermore, at least one of the following may apply:
  the primary order identifier is a key of at least one of the application databases,
  the secondary order identifier is a key of at least one of the application databases, and
  the primary order identifier is a key of only one application database.
In this context, the key may be a unique key or a primary key.

In addition, the querying may comprise calculating a duration of application execution based on the durations of a plurality of actions performed during execution of the application. The method may further comprise calculating the duration of the processed request based on the action durations and/or the application execution duration.

Moreover, the duration information for each action may be stored in the corresponding application database and/or an integration database.

Also, deriving the secondary order identifier may comprise querying a mapping table using the primary order identifier.

In addition, the method may further comprise calculating the duration of an order by determining all actions with the primary order identifier.

In some cases, the method may further calculating the duration of an order by determining all the actions with the primary order identifier. Also, calculating the duration of the order may further comprise calculating an elapsed duration by subtracting an earliest timestamp of an earliest action with the primary order identifier from a latest timestamp of a latest action with the primary order identifier. Moreover, calculating the duration of an order may comprise calculating a summed duration by summing the durations of the actions with the primary order identifier.

Furthermore, the method may further comprise determining an average order duration by summing the durations of all the orders in the application database. The duration of each order may be determined as described above. The method may further comprise determining an average duration that each application was executed during processing of the orders by summing the durations of the actions performed during the execution of the application.

In some cases, the method may comprise determining whether to carry out a performance improvement based on the average order duration, and when the performance improvement is carried out:
  identifying an application for the performance improvement based on the average duration that each application was executed, and
  identifying an action for the performance improvement based on the average duration that each application was executed and/or the durations of the actions.

In some cases, the performance improvement comprises reducing the database operations performed by the identified action.

In addition, the attributes may further describe a key of the corresponding application database.

Moreover, each application database may have a schema that differs from any other application database schema.

Also, each application database may have at least one data type and/or at least one key that differs from the data types and keys of any other application database.

In addition, the method may further comprise identifying each action invoked multiple times, and calculating a group duration of each identified action by aggregating invocations of the identified action and summing the durations of the invocations. In addition, the method may further comprise displaying each identified action followed by the group duration of the action.

According to another aspect, a computer program product comprising computer readable instructions is provided. The instructions, when noted and executed on a computer system, cause the computer system to perform operations according to one of the methods described above.

According to a further aspect, a computer system is provided. The computer system may comprise a client computer operable to calculate a duration of an action, wherein the action comprises at least one database operation, wherein the action is one of multiple actions carried out in order to process a request. Also, the computer system may comprise multiple application databases, each application database operable to store duration information and to receive at least one query from the client computer. In addition, processing the request may include executing multiple applications, each application having a corresponding application database. The execution of one of the applications may include performing the action on the corresponding application database and storing duration information for the action.

The client computer may be operable to calculate the duration of the action by determining a primary order identifier of the action. In addition, the client computer may be operable to derive at least one secondary order identifier by means of the primary order identifier. The client computer may be further operable to query the stored duration information.

The querying may comprise specifying a proper subset of attributes of a plurality of relations, the relations including at least one table, each relation including a plurality of rows. The attributes may describe the primary order identifier. The attributes may further describe the secondary order identifier. The attributes may also describe a subset of the duration information including a start time of the action. The subset of the duration information may further include end time of the action. The querying may further comprise specifying conditions that must be met by at least one row of the relations, wherein at least one condition specifies multiple relations.

In addition, the querying may comprise retrieving, according the conditions, the specified attributes of the at least one row of the relations. Moreover, the querying may comprise calculating a duration of the action based on the start time of the action. The calculation of the duration of the action may also be based on the end time of the action.

In some cases, the client computer may be further operable to calculate a duration of application execution based on the durations of a plurality of actions performed during the execution of the application. In addition, the client computer may be operable to calculate the duration of the processed request based on the action durations and/or the application execution duration. The client computer may be further operable to perform any of the methods described above.

The subject matter described in the specification can be implemented as a method or as a system, or using one or more computer program products. The subject matter described in this specification can be implemented in a data signal or on a machine readable medium, where the medium is embodied in or more information carriers, such as a CD-ROM, a DVD-ROM, a semiconductor memory, or a hard disk. Such computer program products may cause a data processing apparatus to perform one or more operations described in the specification.

In addition, the subject matter described in the specification can also be implemented as a system including a processor, and a memory coupled to the processor. In particular, the system may include a client computer, possibly implemented as a general purpose computer. The memory may include one or more programs to cause the processor to perform one or more of the methods described in the specification. Further subject matter described in the specification can be implemented using various machines.

While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. A computer-implemented method for calculating a duration of processing an order, wherein the order comprises actions comprising at least one database operation,
   wherein processing the order includes executing applications, each application of the applications having a corresponding application database of a plurality of application databases,
   wherein executing the applications includes performing the actions on the corresponding application database and storing duration information for the actions,
   wherein each application database has at least one data type and at least one key that differ from a data type and a key of any other of the application databases, the method comprising:
   determining a primary order identifier of the actions;
   deriving a secondary order identifier by querying a mapping table using the primary order identifier, wherein at least one of the following applies:
     the primary order identifier is a key of at least one of the application databases;
     the secondary order identifier is a key of at least one of the application databases; and
     the primary order identifier is a key of only one of the application databases;
   querying the stored duration information, the querying comprising:
     specifying a subset of attributes of relations, the relations including at least one table, each of the relations including a plurality of rows, the subset of attributes describing:
       the primary order identifier and the secondary order identifier, and
       a subset of the stored duration information including a start time of the actions;
     specifying conditions that must be met by at least one row of the relations; and
     retrieving, according to the conditions, the specified subset of attributes of the at least one row of the relations;
   determining, for each of the applications associated with the primary order identifier, which of the actions are performed during execution of each application;
   calculating a duration of application execution for each application associated with the primary order identifier by at least one of:
     identifying an earliest action of the determined actions and a latest action of the determined actions, and subtracting an earliest timestamp of the identified earliest action from a latest timestamp of the identified latest action; and
     summing durations of the determined actions performed during execution of each application associated with the primary order identifier;
   determining, for each of the applications associated with the secondary order identifier, which of the actions are performed during execution of the application;
   calculating a duration of application execution for each application associated with the secondary order identifier; and
   calculating the duration of the order by adding, across all of the applications associated with the primary and secondary orders, the durations of the actions associated with the primary order identifier and the durations of the actions associated with the secondary order identifier.

2. The method of claim 1, wherein determining the primary order identifier comprises either
receiving the primary order identifier; or
receiving an account identifier, and
determining the primary order identifier based on the account identifier.

3. The method of claim 1, further comprising:
determining an average order duration by summing the durations of all orders in the application databases; and
determining an average duration for an application executed during processing of all the orders by summing the durations of the actions performed during the execution of the application.

4. The method of claim 3, comprising:
determining whether to carry out a performance improvement based on the average order duration; and
in response to determining to carry out the performance improvement:
identifying an application for the performance improvement based on the average execution duration of each application; and
identifying an action of the actions for the performance improvement based on the average execution duration of each application and/or the durations of the actions.

5. The method of claim 4, wherein the performance improvement comprises reducing number of database operations performed by the identified action.

6. The method of claim 1, wherein the subset of attributes further describe a key of the corresponding application database.

7. The method of claim 1, wherein each application database has a schema that differs from any other application database schema.

8. The method of claim 4, further comprising:
identifying each action invoked multiple times;
calculating a group duration of each identified action by aggregating invocations of the identified action and summing durations of the invocations; and
displaying each identified action followed by the group duration of the action.

9. A non-transitory computer readable program comprising instructions, which, when executed by a computer, cause the computer to perform the method of claim 1.

10. A computer system, comprising:
a hardware processor;
application databases, each application database of the application databases to store duration information and to receive at least one query from the hardware processor, wherein each application database has at least one data type and at least one key that differ from a data type and a key of any other of the application databases; and
a storage device comprising instructions that when executed by the hardware processor causes the hardware processor to:
calculate a duration of processing a requested order comprising actions, wherein the actions include executing applications, each application corresponding to the at least one application database, wherein to calculate a duration of each of the actions, the instructions are to cause the hardware processor to:
determine a primary order identifier of the actions;
derive a secondary order identifier by querying a mapping table using the primary order identifier, wherein at least one of the following applies:
the primary order identifier is a key of at least one of the application databases;
the secondary order identifier is a key of at least one of the application databases; and
the primary order identifier is a key of only one of the application databases;
query the stored duration information, wherein to query the stored duration information, the hardware processor is to:
specify a subset of attributes of relations, the relations including at least one table, each relation of the relations including a plurality of rows, the attributes describing:
the primary order identifier and the secondary order identifier, and
a subset of the duration information including a start time of the actions;
specify conditions to be met by at least one row of the plurality of rows of the relations;
retrieve, according to the conditions, the specified subset of attributes of the at least one row of the relations;
determine, for each of the applications associated with the primary order identifier, which of the actions are performed during execution of each application;
calculate a duration of application execution for each application associated with the primary order identifier by at least one of:
identifying an earliest action of the determined actions and a latest action of the determined actions, and subtracting an earliest timestamp of the identified earliest action from a latest timestamp of the identified latest action; and
summing durations of the determined actions performed during execution of each application associated with the primary order identifier;
determine, for each of the applications associated with the secondary order identifier, which of the actions are performed during execution of the application;
calculate a duration of application execution for each application associated with the secondary order identifier; and
calculate the duration of the order by adding, across all of the applications associated with the primary and secondary orders, the durations of the actions associated with the primary order identifier and the durations of the actions associated with the secondary order identifier.

11. The computer system of claim 10, wherein the hardware processor is to:
determine an average order duration of the applications by summing the durations of all orders in the application databases; and
determine an average duration that an application of the applications was executed during processing of all the orders by summing the durations of the actions performed during the execution of the application.

12. The computer system of claim 11, wherein the hardware processor is to:
determine whether to carry out a performance improvement based on the average order duration; and
in response to a determination to carry out the performance improvement:
identify an application of the applications for the performance improvement based on the average duration that each application was executed; and identify an action for the performance improvement based on at least one of the average duration that each application was executed and the durations of the actions.

13. The computer system of claim 12, wherein the performance improvement comprises reducing number of database operations performed by the identified action.

* * * * *